US010511832B1

(12) United States Patent
Shen et al.

(10) Patent No.: US 10,511,832 B1
(45) Date of Patent: Dec. 17, 2019

(54) CALIBRATION OF VIRTUAL IMAGE SYSTEM WITH EXTENDED NASAL FIELD OF VIEW

(71) Applicant: Facebook Technologies, LLC, Menlo Park, CA (US)

(72) Inventors: Shizhe Shen, Foster City, CA (US); Daozhi Wang, Dublin, CA (US); Kurt Jenkins, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 123 days.

(21) Appl. No.: 15/897,072

(22) Filed: Feb. 14, 2018

(51) Int. Cl.
  *G09G 5/00* (2006.01)
  *H04N 13/327* (2018.01)
  *G02B 27/01* (2006.01)
  *H04N 13/344* (2018.01)

(52) U.S. Cl.
  CPC ....... *H04N 13/327* (2018.05); *G02B 27/0172* (2013.01); *H04N 13/344* (2018.05); *G02B 2027/0123* (2013.01); *G02B 2027/0178* (2013.01)

(58) Field of Classification Search
  CPC ......... G09G 3/3406; G09G 2320/0247; G09G 2320/103; G09G 2320/0257; G09G 3/003; G09G 2320/0686; G09G 3/006; G09G 2320/0693; G09G 2360/14; G09G 2360/145; G09G 2356/00; G02B 2027/0178; G02B 27/017; G02B 27/0101; G02B 2027/0118; G02B 6/00; G02B 27/01; G02B 6/0028; G02B 6/003; G02B 2027/0125; G02B 2027/0138; G02B 27/0081; G02B 6/0016; G02B 6/0078; G02B 2027/0136; G02B 2006/12138; G02B 23/26; G02B 2027/0123; G02B 27/0093; G02B 2027/0127; G02B 2027/0147; G02B 27/0025; G02B 5/04
  USPC ........................................................ 345/7–9
  See application file for complete search history.

(56) References Cited

U.S. PATENT DOCUMENTS

| | | | |
|---|---|---|---|
| 8,508,848 B2 * | 8/2013 | Saarikko | G02B 5/1814 359/567 |
| 9,766,381 B2 * | 9/2017 | Jarvenpaa | G02B 5/18 |
| 9,791,703 B1 * | 10/2017 | Vallius | H04N 13/344 |

* cited by examiner

*Primary Examiner* — Duc Q Dinh
(74) *Attorney, Agent, or Firm* — Morgan, Lewis & Bockius LLP

(57) ABSTRACT

A method for calibrating includes obtaining a head-mounted display device that includes an electronic display having an array of display elements and an array of beam steerers located over an inner left portion and an inner right portion of the electronic display. The method also includes obtaining alignment information by selecting a first respective subset of the array of display elements and causing it to emit light, and determining whether the light is received by a first optical sensor in a first position or a second optical sensor in a second position, thereby determining whether the first respective subset of the array of display elements is aligned for the first or the second optical sensor. The method also includes repeating the selecting, causing, and determining operations for a second subset of the array of display elements, and storing the alignment information for calibrating images for presentation by the electronic display.

20 Claims, 14 Drawing Sheets

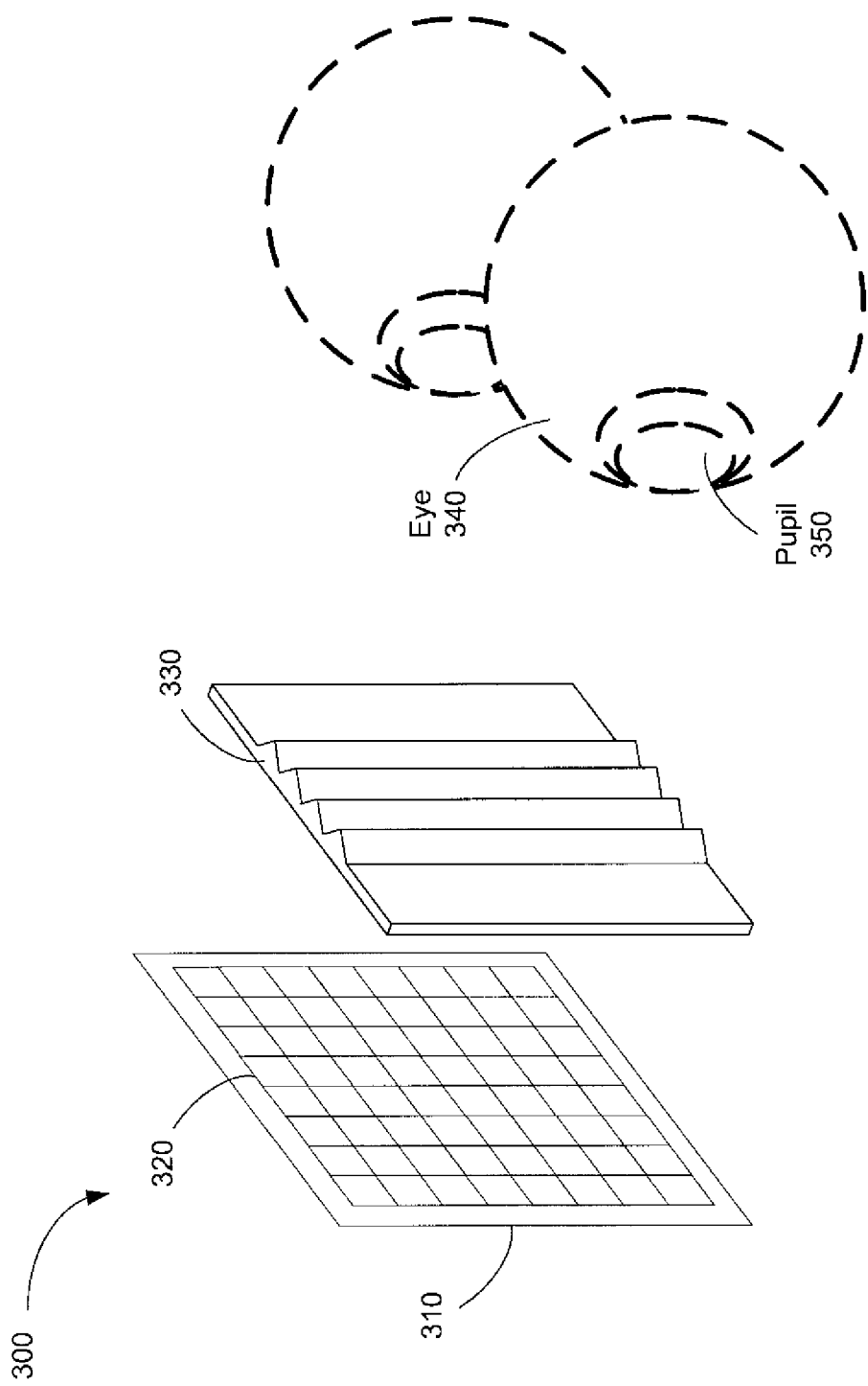

CALIBRATION OF VIRTUAL IMAGE SYSTEM WITH EXTENDED NASAL FIELD OF VIEW

RELATED APPLICATIONS

This application is related to U.S. patent application Ser. No. 15/897,068, entitled "Virtual Image System with Extended Nasal Field of View," filed Feb. 14, 2018, which is incorporated by reference herein in its entirety.

TECHNICAL FIELD

This relates generally to displays, and more specifically to displays used in head-mounted display devices.

BACKGROUND

Head-mounted display devices (also called herein head-mounted displays) are gaining popularity as means for providing visual information to users.

Head-mounted display devices aim to provide users with computer generated images that resemble a real-world environment. In such devices, stereo vision is achieved by displaying two distinct portions of an image to a user, one portion of an image directed to a right eye of the user and another portion of the image directed to a left eye of the user. However, such devices have a limited field of view, which reduces the user experience with the devices.

SUMMARY

Accordingly, there is a need for head-mounted displays that provide users with an increased field of view, thereby enhancing the user's virtual reality experience.

Increasing the field of view conventionally includes implementing large optical elements, such as lenses. However, increasing the nasal field of view is challenging, because the nasal area has a limited space to accommodate large optical elements.

Thus, there is a need for display devices that can enhance the nasal field of view.

The above deficiencies and other problems associated with conventional display devices are reduced or eliminated by the disclosed display devices.

In accordance with some embodiments, a head-mounted display device includes an electronic display having an array of display elements. The electronic display has a left region and a right region that does not overlap with the left region. The left region includes an outer left portion and an inner left portion that does not overlap with the outer left portion. The right region includes an outer right portion and an inner right portion that does not overlap with the outer right portion. The inner left portion and the inner right portion are located between the outer left portion and the outer right portion. The head-mounted display device also includes an array of beam steerers located over at least the inner left portion and the inner right portion of the electronic display. The array of beam steerers is configured to steer at least a first portion of light emitted from the inner left portion of the electronic display in a first direction and steer at least a second portion of light emitted from the inner left portion of the electronic display in a second direction that is distinct from the first direction. The array of beam steerers is also configured to steer at least a third portion of light emitted from the inner right portion of the electronic display in a third direction and steer at least a fourth portion of light emitted from the inner right portion of the electronic display in a fourth direction that is distinct from the third direction.

In accordance with some embodiments, a method for calibrating a head-mounted display device includes obtaining a head-mounted display device that includes an electronic display having an array of display elements. The electronic display has a left portion and a right portion that does not overlap with the left portion. The left portion includes an outer left portion and an inner left portion that does not overlap with the outer left portion. The right portion includes an outer right portion and an inner right portion that does not overlap with the outer right portion. The inner left portion and the inner right portion are located between the outer left portion and the outer right portion. The head-mounted display device also includes an array of beam steerers located over at least the inner left portion and the inner right portion of the electronic display. The method also includes obtaining alignment information by selecting a first respective subset of the array of display elements and causing the first respective subset of the array of display elements to emit light. The method further includes determining whether the light emitted by the first respective subset of the array of display elements is received by a first optical sensor in a first position or a second optical sensor in a second position that is distinct from the first position, thereby determining whether the first respective subset of the array of display elements is aligned for the first optical sensor or the second optical sensor. The method also includes repeating the selecting, causing, and determining operations for a second subset of the array of display elements that is distinct from the first subset of the array of display elements, and storing the alignment information for calibrating images for presentation by the electronic display.

In accordance with some embodiments, a method includes receiving image information for display and modifying the image information based on alignment information that indicates whether respective subsets of the array of display elements are aligned for a first eye of a user or a second eye of the user, thereby obtaining modified image information. The method also includes displaying the modified image information on an electronic display of a head-mounted display device. The electronic display has an array of display elements. The electronic display has a left portion and a right portion that does not overlap with the left portion. The left portion includes an outer left portion and an inner left portion that does not overlap with the outer left portion. The right portion includes an outer right portion and an inner right portion that does not overlap with the outer right portion and the inner left portion and the inner right portion are located between the outer left portion and the outer right portion. The head-mounted display device also includes an array of beam steerers located over at least the inner left portion and the inner right portion of the electronic display.

In accordance with some embodiments, a display system includes a head-mounted display device that includes an electronic display having an array of display elements. The electronic display has a left portion and a right portion that does not overlap with the left portion. The left portion includes an outer left portion and an inner left portion that does not overlap with the outer left portion. The right portion includes an outer right portion and an inner right portion that does not overlap with the outer right portion. The inner left portion and the inner right portion are located between the outer left portion and the outer right portion. The head-mounted display device also includes an array of beam steerers located over at least the inner left portion and the inner right portion of the electronic display. The head-mounted display device also includes one or more processors and memory. The memory stores alignment information that indicates whether respective subsets of the array of display elements are aligned for the first optical sensor or the second optical sensor. The memory also stores instructions for: receiving image information, modifying the image information based on the alignment information, thereby obtaining modified alignment information, and displaying the modified image information on the electronic display.

Thus, the disclosed embodiments provide virtual image systems (e.g., display systems for displaying virtual images, such as images for virtual reality) with an extended nasal field of view.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is an isometric view of a display device in accordance with some embodiments.

These figures are not drawn to scale unless indicated otherwise.

DETAILED DESCRIPTION

Many head-mounted display devices are configured to simultaneously display distinct portions of an image to the left and right eyes. By displaying the two distinct portions of an image to separate eyes, the display device can provide a three-dimensional perception to a user even when the display device has a two-dimensional display. A wide field of view increases the immersiveness of the virtual reality experience, which, in turn, enhances the user satisfaction with the display device.

The disclosed embodiments provide display devices with increased nasal fields of view.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first prism could be termed a second prism, and, similarly, a second prism could be termed a first prism, without departing from the scope of the various described embodiments. The first prism and the second prism are both prisms, but they are not the same prism.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
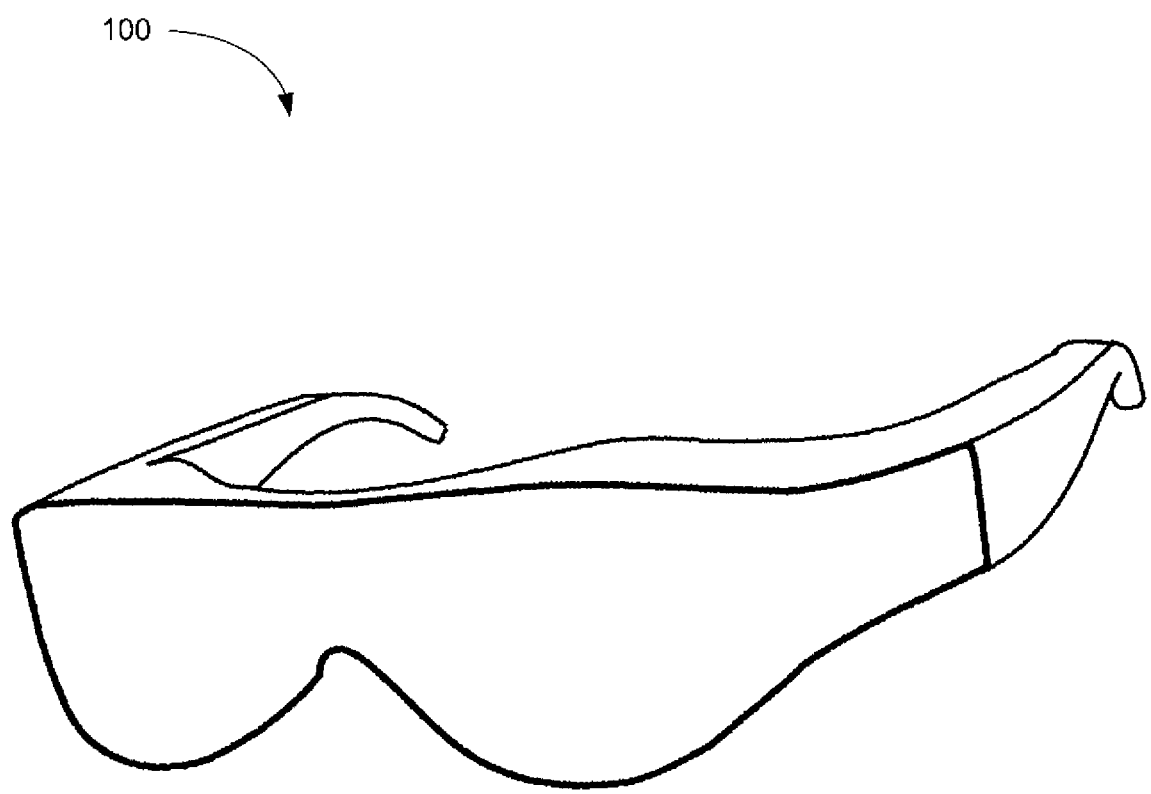
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
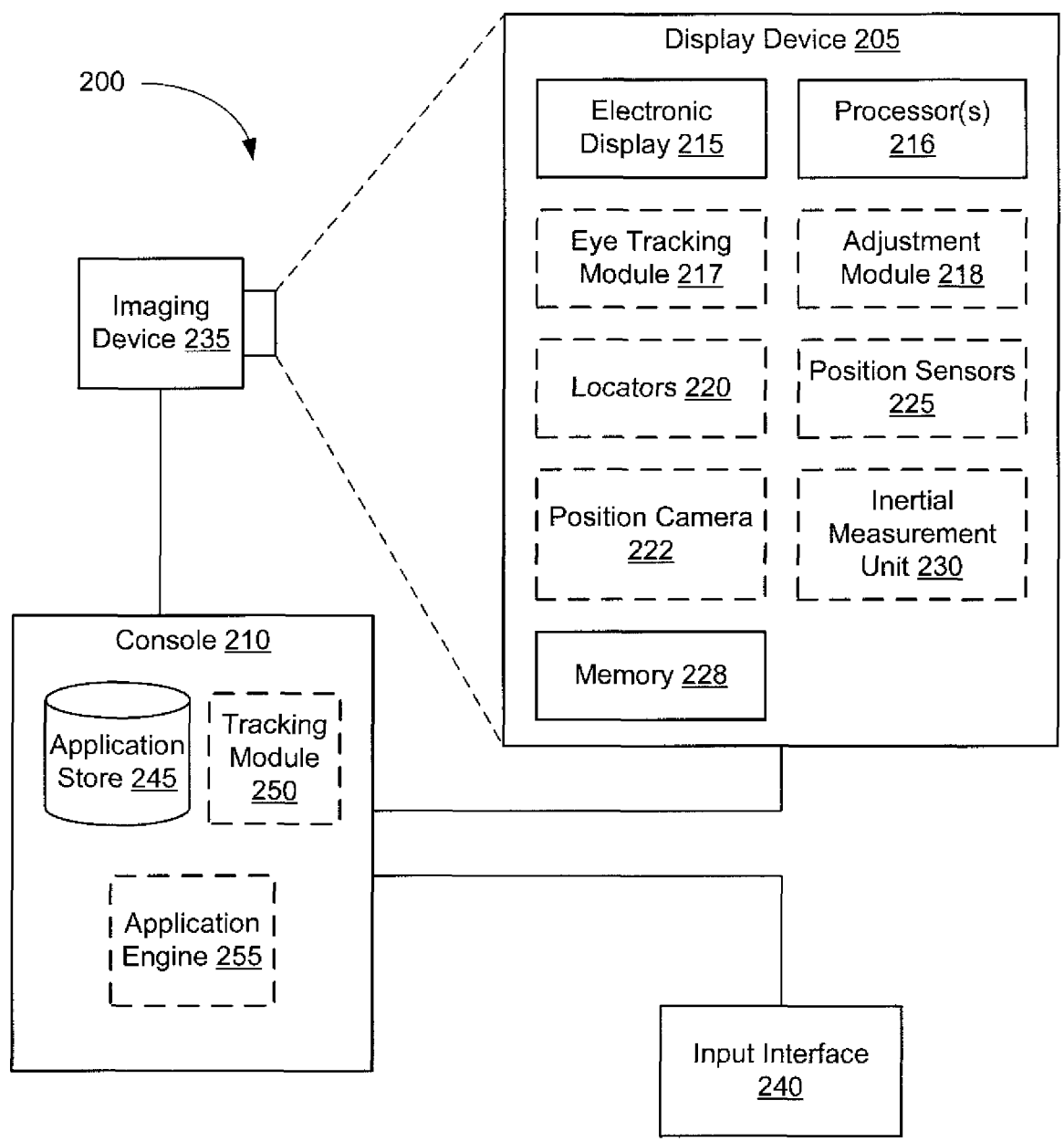
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (e.g., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3A is an isometric view of display device 300 in accordance with some embodiments. In some embodiments, display device 300 includes light emission device array 310. In some embodiments, display device 300 also includes an emission intensity array and an IR detector array. In some embodiments, light emission device array 310 corresponds to electronic display 215 described above with respect to FIG. 2.

Light emission device array 310 emits image light and optional IR light toward the viewing user. Light emission device array 310 may be, e.g., an array of LEDs, an array of microLEDs, an array of OLEDs. or some combination thereof. Light emission device array 310 includes light emission devices 320 that emit light in the visible light (and optionally includes devices that emit light in the IR).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the pupil 350 of eye 340 of a user. In some embodiments, display device 300 uses the emission intensity array to facilitate providing image light to a location of pupil 350 *o*, and minimize the amount of image light provided to other areas in the eyebox.

In some embodiments, display device 300 is optically coupled with array 330 of beam steerers, as shown in FIG. 3A. Array 330 of beam steerers is similar to arrays of beam steerers described with respect to FIGS. 4A-4D.

In some embodiments, display device 300 also includes one or more lenses or lens assemblies that receive the modified image light (e.g., attenuated light) from the emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted toward the determined location of pupil 350, and not toward other locations in the eyebox.

Figure 3B:
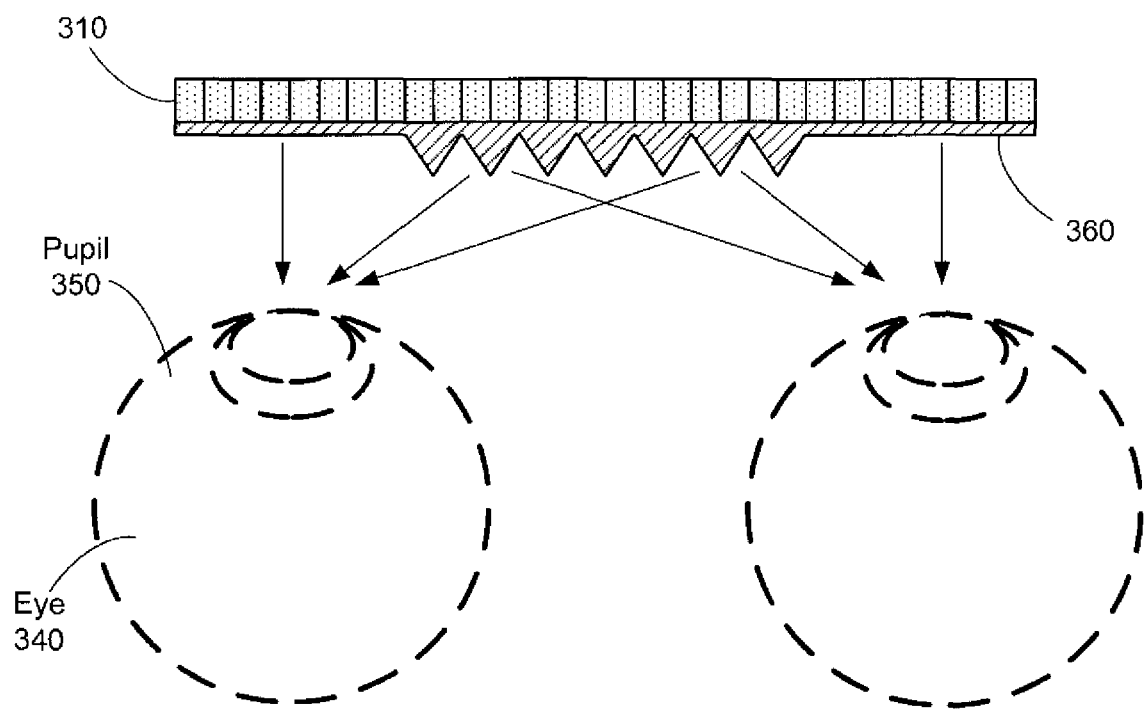
FIG. 3B is a plan view of a display device in accordance with some embodiments.

FIG. 3B is a plan view of a display device in accordance with some embodiments.

The display device includes light emission array 310 and array 360 of beam steerers, similar to display device 300 described herein with respect to FIG. 3A. Array 360 of beam steerers is similar to arrays of beam steerers described with respect to FIGS. 4A-4D. As shown in FIG. 3B, array 360 of beam steerers is configured to transmit light toward a respective eye, thereby increasing a nasal field of view.

Figure 4A:
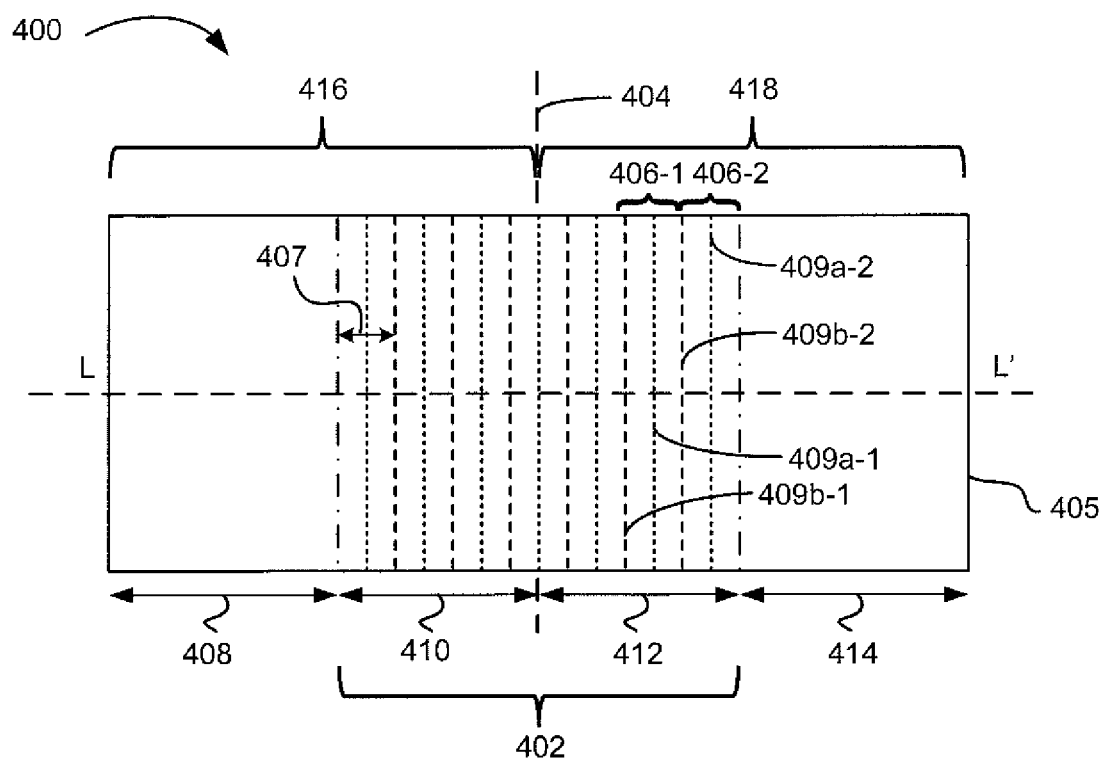
FIG. 4A is a schematic diagram illustrating a front elevational view of a display device in accordance with some embodiments.

FIG. 4A is a schematic diagram illustrating a front elevational view of display device 400 in accordance with some embodiments. In some embodiments, display device 400 corresponds to display device 100 described above with respect to FIG. 1. Display device 400 includes electronic display 405 and array 402 of beam steerers. Reference axis 404 defines an intersection of left region 416 and right region 418 of electronic display 405. In FIG. 4A, reference axis 404 passes through the middle of display device 400. In some embodiments, electronic display 405 is a single contiguous display with regions 416 and 418. In some embodiments, left region 416 is not contiguous with right region 418 (e.g., in some embodiments, display device 400 includes a first display device for left region 416 and a second display device, that is distinct and separate from the first display device, for right region 418).

Left region 416 includes outer left portion 408 and inner left portion 410 and right region 418 includes outer right portion 414 and inner right portion 412. Outer left portion 408 emits light toward a left eye of a user and outer right portion 414 emits light toward a right eye of a user, when the user is wearing display device 400. Inner left portion 410 and inner right portion 412 correspond to the nasal area of display device 400. Inner left portion 410 and inner right portion 412 each have a width ranging from 5 mm to 40 mm (e.g., 5, 10, 15, 20, 25, 30, 35, or 40 mm). In some embodiments, a distance between inner left portion 410 and inner right portion 412 is not more than 40 mm.

In some embodiments, electronic display 405 is coupled or attached (e.g., by an adhesive or by one or more mechanical couplers, such as one or more screws or one or more clamps) with array 402 of beam steerers. Array 402 of beam steerers includes a plurality of beam steering elements, such as prisms 406-1 and 406-2. In FIG. 4A, array 402 of beam steerers includes seven prisms. Dashed lines 409*a* (e.g., dashed lines 409*a*-1 and 409*a*-2) illustrate the peaks and dashed lines 409*b* (e.g., dashed lines 409*b*-1 and 409*b*-2) illustrate the valleys of prisms of array 402. Prisms 406-1 and 406-2 of array 402 have pitch 407 (e.g., a base width) of at least 10 μm (e.g., 10, 15, 20, 25, 30, etc.). Array 402 of beam steerers is located over inner left portion 410 and inner right portion 412 of electronic display 405. In some embodiments, array 402 of beam steerers is a grating. In some embodiments, array 402 of beam steerers extends beyond inner left portion 410 to the outer left portion 408 and beyond inner right portion 412 to outer right portion 414.

In FIG. 4A, display device 400 has a rectangular shape with array 402 of beam steerers arranged in a rectangular shape. However, the shape of display device 400 could be configured to have any shape suitable for a head-mounted display device. In FIG. 4A, each prism of array 402 of beam steerers extends along the height of display device 400 (e.g., extending from the top portion to the bottom portion of display device 400). Also array 402 of beam steerers can be arranged in different shapes. In some embodiments, the shape of array 402 is configured by arranging together prisms of different lengths. In FIG. 4A, all prisms (e.g., prisms 406-1 and 406-2) have an equal length and they extend along the length of display device 400. In some embodiments, all prisms have an equal length shorter than the height of display device 400 (e.g., the prisms cover a vertically central portion of display device 400 but does not extend along the entire height of display device 400).

Figure 4B:
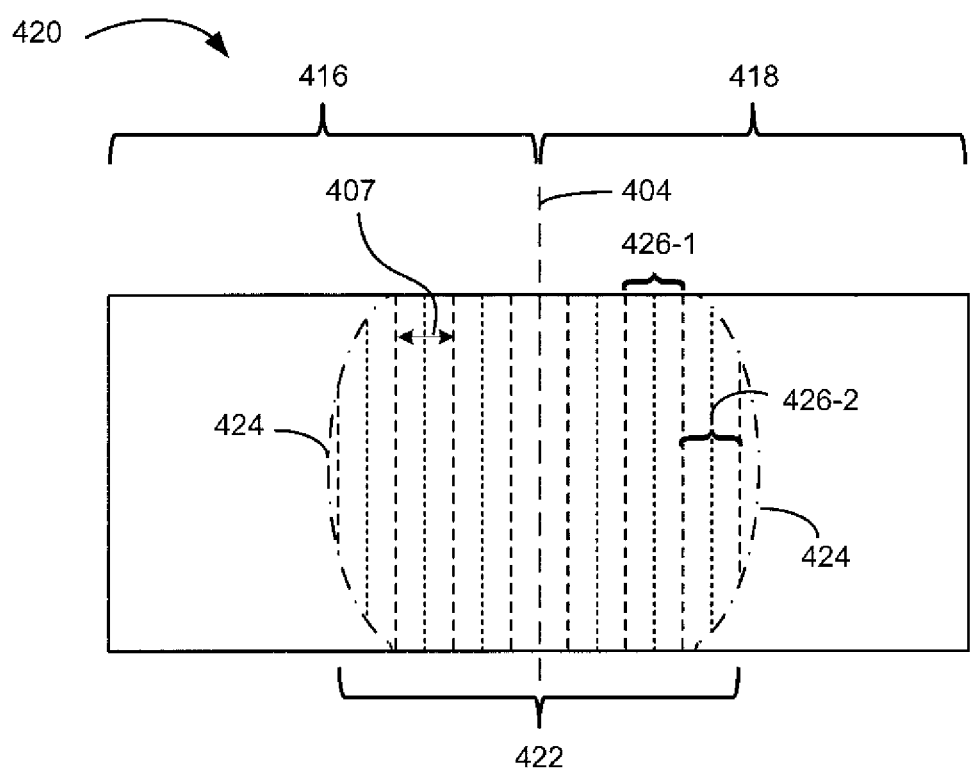
FIG. 4B is a schematic diagram illustrating a front elevational view of a display device in accordance with some embodiments.

FIG. 4B is a schematic diagram illustrating a front elevational view of display device 420 in accordance with some embodiments. Display device 420 corresponds to display device 400 of FIG. 4A except that display device 420 has array 422 of beam steerers arranged in a barrel shape. The barrel shape is illustrated with lines 424. When arranged in a barrel shape, prism 426-1 extends along the height of display device 420, whereas prism 426-2, which is the outermost prism of array 422, is shorter than prism 426-1. In FIG. 4B, an edge of prism 426-2 follows line 424 so that prism 426-2 forms a portion of a barrel shape. In some embodiments, the barrel shape is arranged so that one or more prisms positioned near the outer edge of array 422 are shorter and have curved edges so that the prisms collectively have a barrel shape.

Figure 4C:
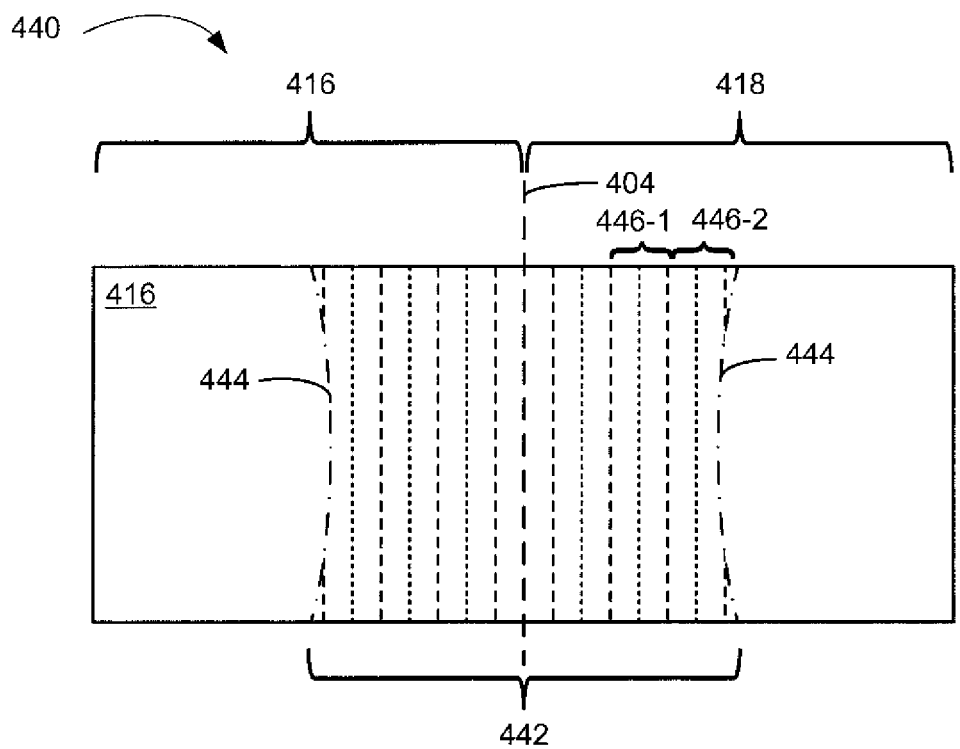
FIG. 4C is a schematic diagram illustrating a front elevational view of a display device in accordance with some embodiments.

FIG. 4C is a schematic diagram illustrating a front elevational view of display device 440 in accordance with some embodiments. Display device 440 corresponds to display device 400 of FIG. 4A except that display device 440 has array 442 of beam steerers arranged in an hourglass shape. The hourglass shape is illustrated with lines 444. When arranged in an hourglass shape, prisms 446-1 and 446-2 extend along the height of display device 440. Prism 446-2, which is the outermost prism of array 442, has a curved edge that follows line 444. In some embodiments, the hourglass shape is arranged so that one or more prisms positioned near the outer edge of array 442 have a curved edge so that the prisms collectively have the hourglass shape.

In some embodiments, a display device is configured similarly to display device 400 of FIG. 4A except that the display device has an array of beam steerers arranged in any other shape (e.g., a pincushion shape).

Figure 4D:
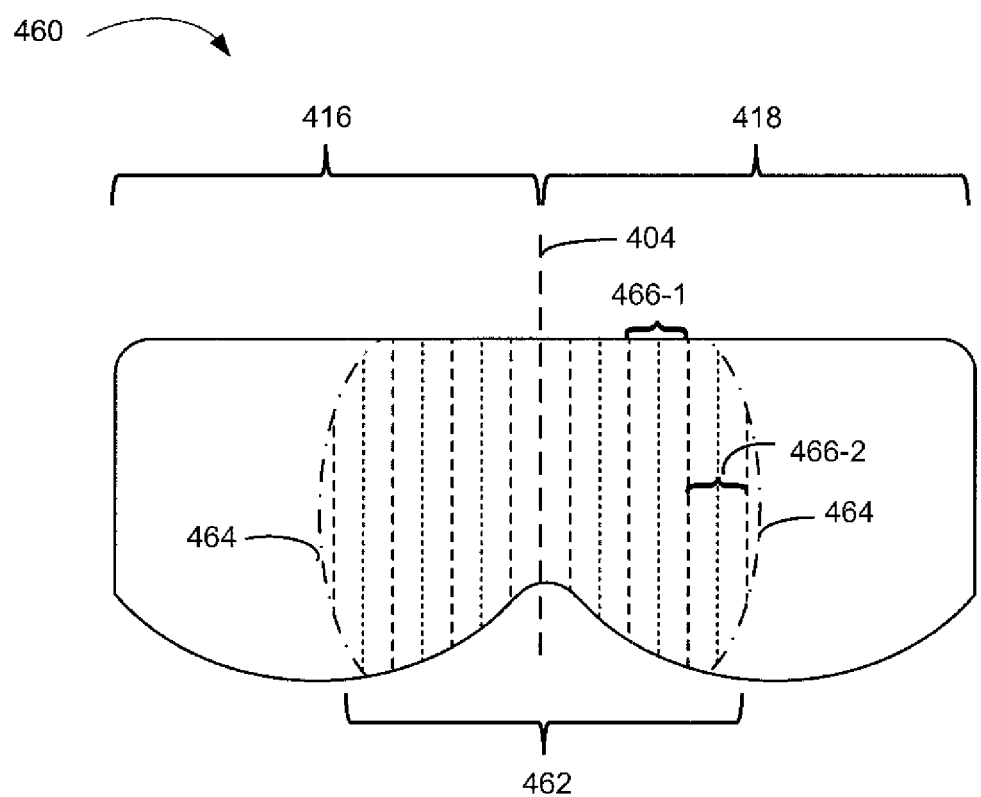
FIG. 4D is a schematic diagram illustrating a front elevational view of a display device in accordance with some embodiments.

FIG. 4D is a schematic diagram illustrating a front elevational view of display device 460 in accordance with some embodiments. Display device 460 corresponds to display device 420 of FIG. 4B except that display device 460 has a shape of goggles with array 462 of beam steerers arranged in a barrel shape. Prism 466-1 extends along the height of display device 460 having the top and bottom edges curved along the shape of display device 460. The barrel shape is illustrated with lines 464. Prism 466-2, which is the outermost prism of array 462, is shorter than prism 466-1 and has a curved shape along the shape of display device 460 and line 464 illustrating the edge of the barrel shape.

Figure 5A:
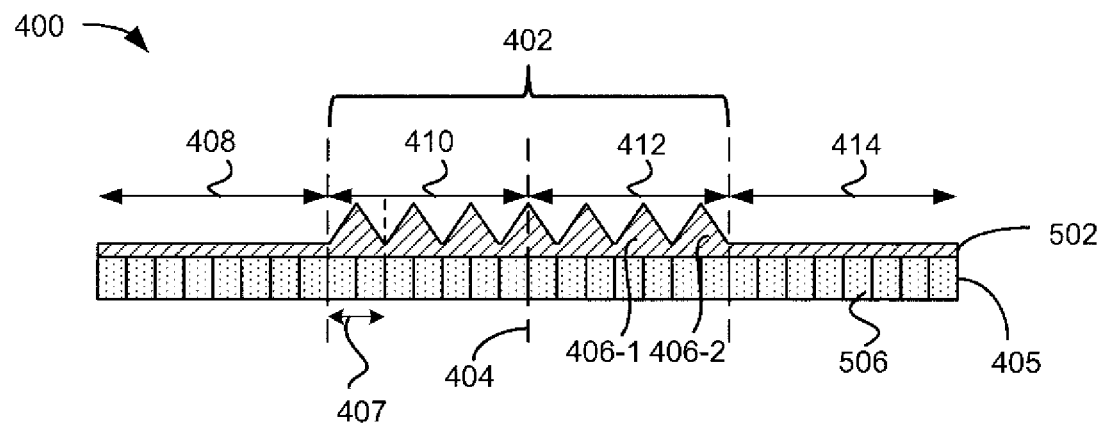
FIG. 5A is a schematic diagram illustrating a cross-sectional view of the display device of FIG. 4A in accordance with some embodiments.

FIG. 5A is a schematic diagram illustrating a cross-sectional view of display device 400 of FIG. 4A in accordance with some embodiments. Line LL' on the front elevational view in FIG. 4A represents a plane upon which the cross-sectional view of FIG. 5A is taken. Display device 400 includes electronic display 405 and array 402 of beam steerers. In some embodiments, electronic display 405 corresponds to light emission device array 310 described above with respect to FIG. 3A. Electronic display includes arrays of pixels 506 that emit light in the visible region. In some embodiment, electronic display 405 is an LCD and pixels 506 are liquid crystal based pixels. In some embodiments, electronic display 405 is an OLED display (e.g., an active-matrix OLED display). In some embodiments, pixels 506 are shaped as squares, rectangles, other polygons (e.g., pentiles or chevrons) and/or some combination thereof.

In some embodiments, array 402 of beam steerers is coupled or attached (e.g., by an adhesive or by one or more mechanical couplers, such as one or more screws or one or more clamps) to electronic display 405. In some embodiments, array 402 of beam steerers is optically coupled with electronic display 405. In some embodiments, array 402 of beam steerers is part of optical film 502. In some embodiments, array 402 of beam steerers is attached (e.g., by an adhesive) to optical film 502. In Figure 5A, optical film 502 extends along the surface area of electronic display 405. In some embodiments, optical film 502 extends along a portion of the surface area of electronic display 405 (e.g., along inner left portion 410 and inner left portion 412). Array 402 and optical film 502 are made of an optically transparent material. Such materials include glass (e.g., N-BK7, N-SF11, and F2; barium borate; barium fluoride; magnesium fluoride; sapphire; calcium fluoride; fused silica; calcite; etc.), plastics (e.g., thermoplastic polymers including polycarbonates), polymethylmethacrylate (PMMA), other optical substrate materials and/or any combination thereof. Intersection of inner left portion 410 and inner right portion 412 is indicated by reference axis 404 and array 402 of beam steerers extends along the width of inner left portion 410 and inner right portion 412. Prisms, such as prisms 406-1 and 406-2, each include a base surface, a first lateral surface, and a second lateral surface, and the base surface is positioned toward electronic display 506. Prisms 406-1 and 406-2 of array 402 have pitch 407 (e.g., a base width) of at least 10 μm (e.g., 10, 15, 20, 25, 30, etc.). In FIG. 5A, pitch 407 of prisms 406-1 and 406-2 corresponds to a width of two pixels 506 (e.g., pitch 407 is two times of the width of pixel 506). Prisms 406-1 and 406-2 of array 402 have shapes of equilateral triangles, and are of equal sizes. In some embodiments, the shape, pitch and/or the height of the prisms of array 402 vary. In some embodiments, the prisms of array 402 have other polygonal shapes. In some embodiments, the prisms of array 402 have non-flat surfaces (e.g., the prisms have concave or convex shapes).

Figure 5B:
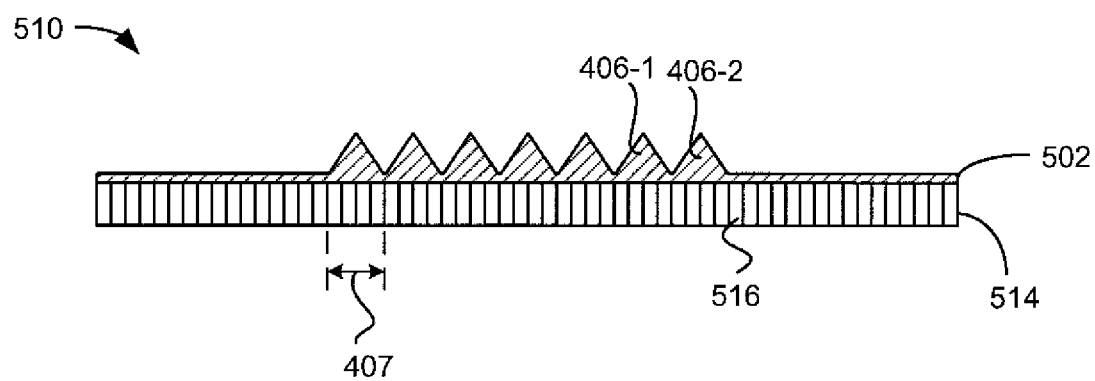
FIG. 5B is a schematic diagram illustrating a cross-sectional view of a display device in accordance with some embodiments.

FIG. 5B is a schematic diagram illustrating a cross-sectional view of display device 510 in accordance with some embodiments. Display device 510 corresponds to display device 400 except that pitch 407 of prisms 406-1 and 406-2 corresponds to a width of four pixels 516 of electronic display 514. In some embodiments, pitch 407 corresponds to a width of two or more pixels 506 (e.g., 2, 3, 4, 5, 6, 7, 8, 9, 10, 15, 20, 25, etc.).

Figure 5C:
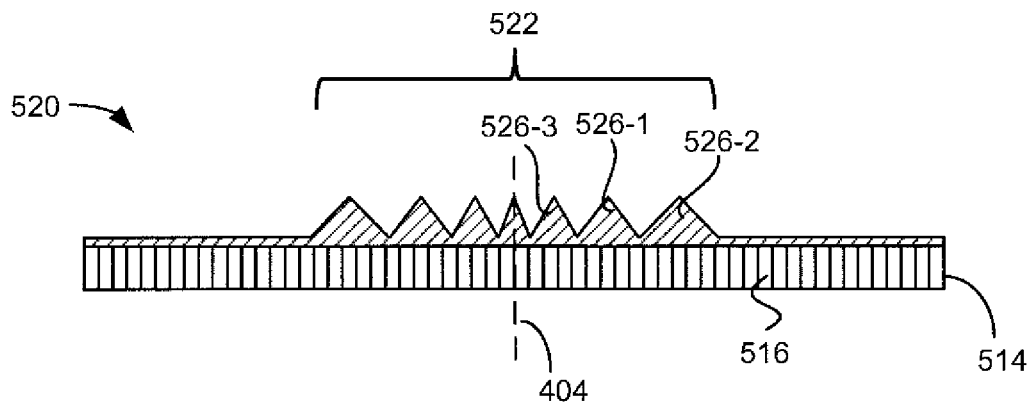
FIG. 5C is a schematic diagram illustrating a cross-sectional view of a display device in accordance with some embodiments.

FIG. 5C is a schematic diagram illustrating a cross-sectional view of display device 520 in accordance with some embodiments. Display device 520 corresponds to display device 510 except that array 522 of beam steerers includes prisms with different triangular shapes. For example, prism 526-1 has a shape of an equilateral triangle and prisms 526-2 and 526-3 have shapes of isosceles triangles. The angles between the base and the lateral surfaces of prisms 526-1, 526-2, and 526-3 vary dynamically based on a distance between respective prisms 526-1, 526-2, and 526-3 and reference axis 404.

Figure 5D:
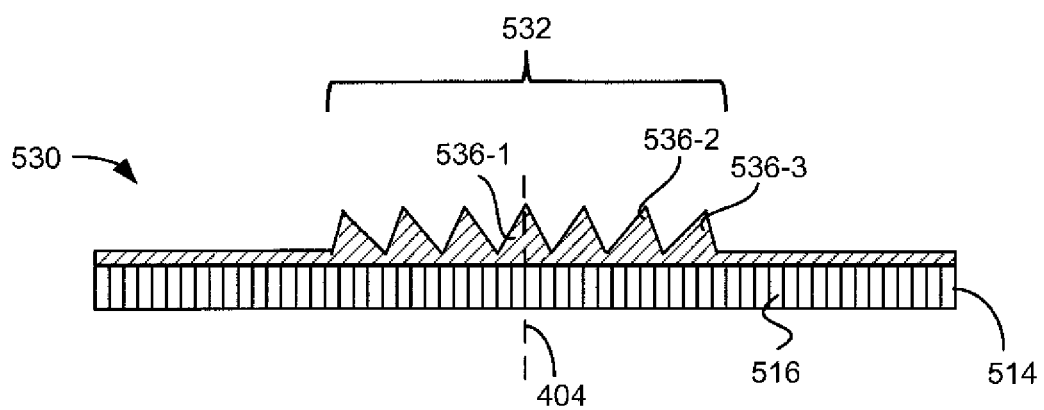
FIG. 5D is a schematic diagram illustrating a cross-sectional view of a display device in accordance with some embodiments.

FIG. 5D is a schematic diagram illustrating a cross-sectional view of display device 530 in accordance with some embodiments. Display device 530 corresponds to display device 510 except that array 532 of beam steerers includes prisms with different asymmetric triangular shapes. For example, prisms 536-2 and 536-3 have shapes of asymmetric triangles, while prism 536-1 has a shape of an equilateral triangle. Prism 536-2 has angles of 50 degrees and 70 degrees between the base and the lateral surfaces. Prism 536-3 has angles 45 degrees and 75 degrees between the base and the lateral surfaces. In some embodiments, the asymmetric triangular shape of prisms 536-2 and 536-3 varies based on the distance between respective prisms 536-2 and 536-3 and reference axis 404.

Figure 5E:
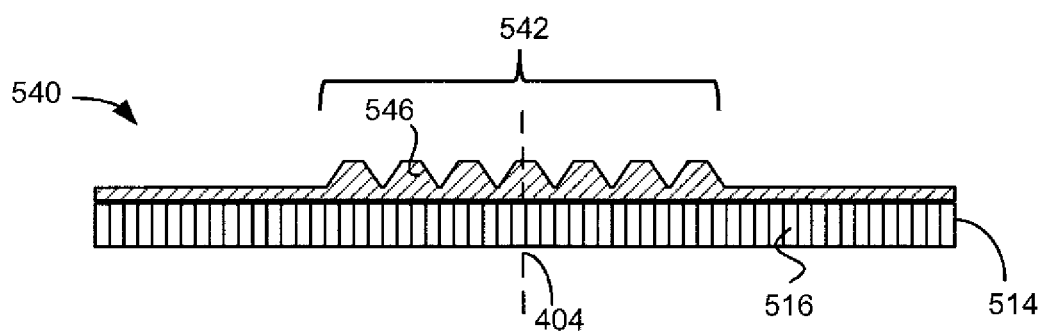
FIG. 5E is a schematic diagram illustrating a cross-sectional view of a display device in accordance with some embodiments.

FIG. 5E is a schematic diagram illustrating a cross-sectional view of display device 540 in accordance with some embodiments. Display device 540 corresponds to display device 510 except that array 542 of beam steerers includes prisms 546 with trapezoidal shapes.

Figure 6A:
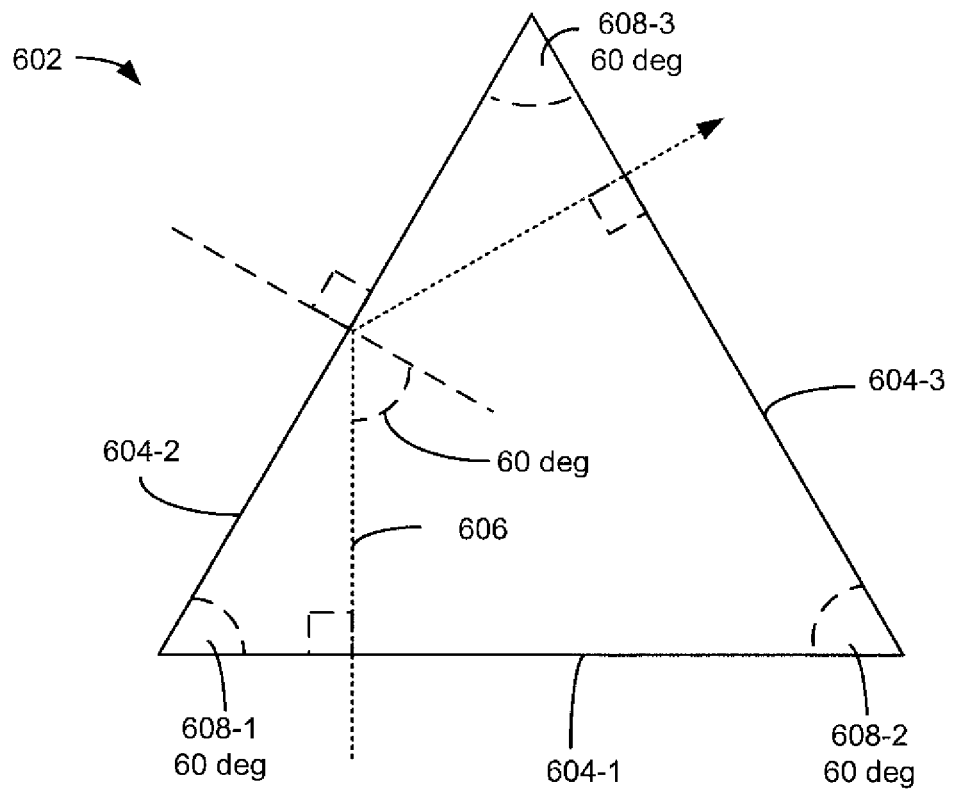
FIG. 6A is a schematic diagram illustrating interaction of light with a prism in accordance with some embodiments.
Figure 6B:
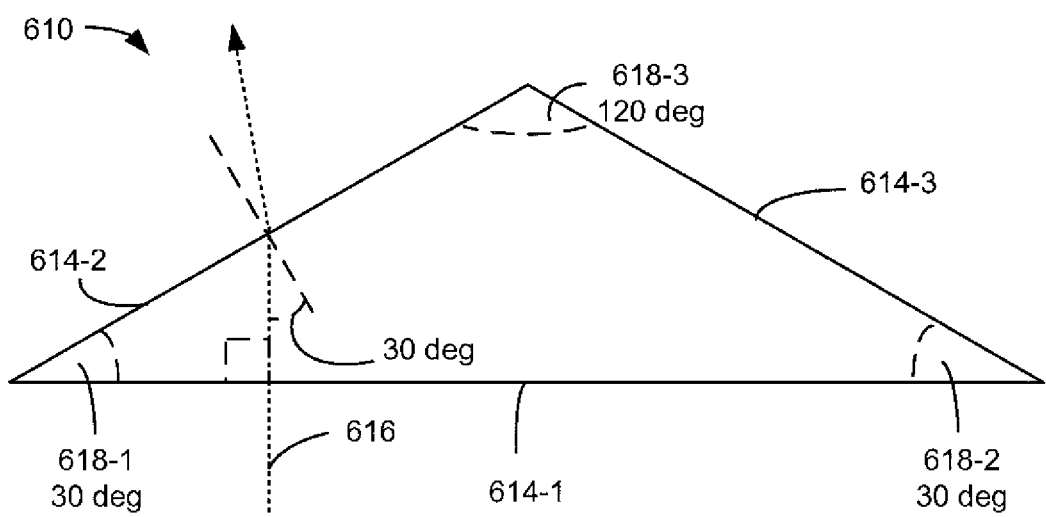
FIG. 6B is a schematic diagram illustrating interaction of light with a prism in accordance with some embodiments.

FIGS. 6A and 6B illustrate how prisms, such as those shown in FIGS. 5A-5E, steer light from inner left portion 410 and inner right portion 412 (e.g., the nasal area) of display device 400 toward a left eye and a right eye.

FIG. 6A is a schematic diagram illustrating interaction of light with prism 602 in accordance with some embodiments. Prism 602 corresponds to prisms 406-1 and 406-2 of array 402 of beam steerers described above with respect to FIGS. 4A and 5A. Prism 602 has base surface 604-1, lateral surface 604-2 and lateral surface 604-3. Base surface 604-1 faces electronic display 405 when array 402 of beam steerers is coupled with electronic display 405, as shown in FIG. 5A. Lateral surface 604-2 and base surface 604-1 define angle 608-1, lateral surface 604-3 and base surface 604-1 define angle 608-2 and lateral surface 604-2 and lateral surface 604-3 define angle 608-3. Prism 602 shown in FIG. 6A is an equilateral triangle, but as described with respect to FIGS. 5C-5E, prisms can have other triangular or polygonal shapes. Ray 606 is transmitted through base surface 604-1 perpendicularly to base surface 604-1, and it impinges on lateral surface 604-2 at a 60 degree angle of incidence. In FIG. 6A, this angle is above a critical angle. The critical angle is an angle of incidence beyond which rays of light passing through a dense medium to a surface of a less dense medium are reflected. For example, the critical angle for a glass and air interface is approximately 42 degrees and the critical angle for a PMMA and air interface is approximately 43 degrees. Therefore, ray 606 is internally reflected toward lateral surface 604-3, and transmitted through lateral surface 604-3 (e.g., at a 90 degree angle of incidence relative to lateral surface 604-3).

FIG. 6B is a schematic diagram illustrating interaction of light with prism 610 in accordance with some embodiments. Prism 610 has base surface 614-1, lateral surface 614-2 and lateral surface 614-3. Base surface 614-1 faces electronic display 415 when array 544 of beam steerers is coupled with electronic display 415, as shown in FIG. 5C. Lateral surface 614-2 and base surface 614-1 define angle 618-1 (30 degrees), lateral surface 614-3 and base surface 614-1 define angle 618-2 (30 degrees) and lateral surface 614-2 and lateral surface 614-3 define angle 618-3 (120 degrees). Prism 610 shown in FIG. 6R is an isosceles triangle. Ray 616 is transmitted through base surface 614-1 at a 90 degree angle of incidence, and it impinges on lateral surface 614-2 at a 30 degree angle of incidence. This angle is below the critical angle. Therefore, ray 616 is refracted trough lateral surface 614-2.

Figure 6C:
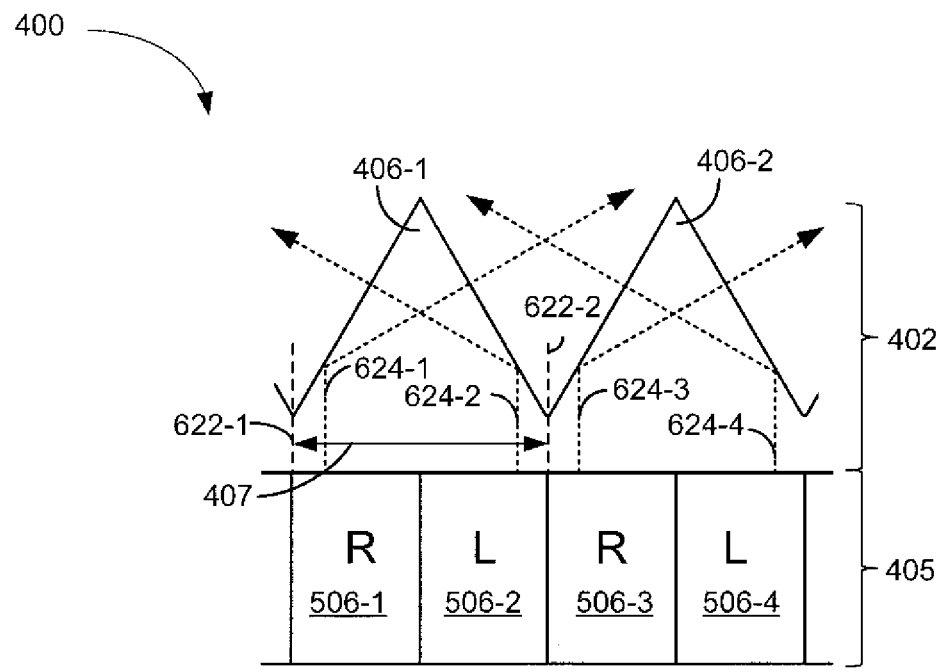
FIG. 6C is a schematic diagram illustrating transmission of light by a display device in accordance with some embodiments.

FIG. 6C is a schematic diagram illustrating transmission of light in display device 400 in accordance with some embodiments. FIG. 6C shows a portion of electronic display 405 with pixels 506-1, 506-2, 506-3, and 506-4. Electronic display 405 is coupled with array 402 of beam steerers which includes prisms 406-1 and 406-2. In FIG. 6C, pitch 407 of prism 406-1 corresponds to a combined width of pixels 506-1 and 506-2. Array 402 of beam steerers is aligned with electronic display 405 so that valley 622-2 is aligned with edges of pixels 506-2 and 506-3 (e.g., valley 622-2 is aligned with intersection of pixels 506-2 and 506-3). Similarly, valley 622-1 is aligned with an left edge of pixel 506-1. Rays 624-1, 624-2, 624-3, and 624-4 are emitted by pixels 506-1, 506-2, 506-3, and 506-4, respectively, and are transmitted through the base surfaces prisms 406-1 and 406-2. Because the angle of incidence at the intersection of the optical material and air is above the critical angle, rays 624-1, 624-2, 624-3, and 624-4 are internally reflected toward the opposing lateral surfaces. Rays 624-1 and 624-3 are steered towards right (R), whereas rays 624-2 and 624-4 are steered towards left (L). Therefore, pixels 506-1 and 506-3, marked with R, emit light toward the right eye of a user whereas pixels 506-2 and 506-4, marked with L, emit light toward the left eye of the user.

Based on the illustration of FIG. 6C, electronic device 400 is configured in such a way that at least outer left portion 408, inner left portion 410 and inner right portion 412 are visible to a left eye of the user, and outer right portion 414, inner right portion 412 and inner left portion 410 are visible to a right eye of the user, when the user is wearing display device 400. With such configuration, display device 400 has an extended field of view in the nasal area, which improves the immersiveness of virtual reality images and increases user's enjoyment of the system.

In light of these principles, we now turn to certain embodiments of a head-mounted display device.

In accordance with some embodiments, a head-mounted display device includes an electronic display having an array of display elements. The electronic display has a left region and a right region that does not overlap with the left region. The left region includes an outer left portion and an inner left portion that does not overlap with the outer left portion. The right region includes an outer right portion and an inner right portion that does not overlap with the outer right portion.

The inner left portion and the inner right portion are located between the outer left portion and the outer right portion. For example, FIGS. 4A and 5A illustrate a front elevational view and a cross-sectional view of display device 400, respectively. Display device 400 includes electronic display 405 with an array of pixels 506. Electronic display 405 has left region 416 and right region 418 that does not overlap with left region 416. Left region 416 includes outer left portion 408 and inner left portion 410 that does not overlap with outer left portion 408. Right region 418 includes outer right portion 414 and inner right portion 412 that does not overlap with outer right portion 414. Inner left portion 410 and inner right portion 412 are located between outer left portion 416 and outer right portion 418.

The head-mounted display device also includes an array of beam steerers located over at least the inner left portion and the inner right portion of the electronic display (e.g., array 402 of beam steerers in FIG. 4A). The array of beam steerers is configured to steer at least a first portion of light emitted from the inner left portion of the electronic display in a first direction and steer at least a second portion of light emitted from the inner left portion of the electronic display in a second direction that is distinct from the first direction. The array of beam steerers is also configured to steer at least a third portion of light emitted from the inner right portion of the electronic display in a third direction and steer at least a fourth portion of light emitted from the inner right portion of the electronic display in a fourth direction that is distinct from the third direction. For example, in FIG. 6C, array 402 of beam steerers steers rays 624-1 and 624-3, emitted by pixels 506-1 and 506-3, toward right, and rays 624-2 and 624-4, emitted by pixels 506-2 and 506-4, toward left. In FIG. 4A, array 402 of beam steerers is located over inner left portion 410 and inner right portion 412 of electronic display 405. Based on FIG. 6C, array 402 of beam steerers is configured to steer light a first portion of light from inner left portion 410 toward left (e.g., ray 624-2) and a second portion of light from inner left portion 410 toward right (e.g., ray 624-1). Similarly, array 402 of beam steerers is configured to steer a third portion of light from inner right portion 412 toward left (e.g., ray 624-4) and a fourth portion of light from inner right portion 412 toward right (e.g., ray 624-3).

In some embodiments, the array of beam steerers is configured to steer at least the first portion of light emitted from the inner left portion of the electronic display and the third portion of light emitted from the inner right portion of the electronic display toward a left eye of a user and steer at least the second portion of light emitted from the inner left portion of the electronic display and the fourth portion of light emitted from the inner left portion of the electronic display toward a right eye of the user. For example, the direction of rays 624-1 and 624-3 is toward a right eye and direction of rays 624-2 and 624-4 is toward a left eye of the user in FIG. 6C.

In some embodiments, the device is configured in such a way that at least the outer left portion, the inner left portion, and the inner right portion are visible to a left eye of a user and at least the outer right portion, the inner right portion, and the inner left portion are visible to a right eye of the user when the device is worn by the user. For example, in FIG. 4A, outer left portion 408, inner left portion 410 and inner right portion 412 are visible to the left eye. Array 402 of beam steerers directs a portion of light (e.g., rays 624-2 and 624-4 shown in FIG. 6C) toward the left eye. Similarly outer right portion 414, inner right portion 412 and inner left portion 410 are visible to the right eye. Array 402 of beam steerers directs a portion of light (e.g., rays 624-1 and 624-3 shown in FIG. 6C) toward the right eye.

In some embodiments, the array of beam steerers includes an array of prisms (e.g., array 402 of beam steerers includes prisms 406-1 and 406-2 in FIG. 4A).

In some embodiments, a respective prism of the array of prisms has at least three optical surfaces, including a base surface, a first lateral surface, and a second lateral surface, and the base surface is positioned toward the electronic display For example, prism 602 has base surface 604-1, lateral surface 604-2 and lateral surface 604-3 in FIG. 6A. In FIG. 5A, base surfaces of prisms 406-1 and 406-2 are positioned toward electronic display 405.

In some embodiments, the base surface and the first lateral surface define a first angle (e.g., angle 608-1 in FIG. 6A) and the base surface and the second lateral surface define a second angle (e.g., angle 608-2 in FIG. 6A). In some embodiments, the second angle is distinct from the first angle (e.g., the prism has a shape of an asymmetric triangle). In some embodiments, the second angle is identical to the first angle (e.g., angle 608-1 and angle 608-2 are identical).

In some embodiments, the base surface and the first lateral surface define a first angle (e.g., angle 608-1 in FIG. 6A) and the base surface and the second lateral surface define a second angle (e.g., angle 608-2 in FIG. 6A). At least one of the first angle and the second angle is determined based on a distance between the respective prism and a reference axis located between the inner left portion and the inner right portion. For example, in FIG. 5C, prisms 526-1 and 526-2 are isosceles triangles so that the angles corresponding to angles 608-1 and 608-2 are determined based on a distance between the respective prism and reference axis 404. As another example, prisms 536-2 and 536-3 are asymmetric triangles so that at least one of the angles corresponding to angles 608-1 and 608-2 is based on a distance between the respective prisms and reference axis 404 in FIG. 5D.

In some embodiments, a first prism of the array of prisms has at least three optical surfaces, including a base surface, a first lateral surface, and a second lateral surface (e.g., prism 526-1 in FIG. 5C). A second prism of the array of prisms has at least three optical surfaces, including a base surface, a first lateral surface, and a second lateral surface (e.g., prism 526-2 in FIG. 5C). The base surface of the first prism and the first lateral surface of the first prism define an angle that is distinct from an angle defined by the base surface of the second prism and the first lateral surface of the second prism and an angle defined by the base surface of the second prism and the second lateral surface of the second prism. The base surface of the first prism and the second lateral surface of the first prism defines an angle that is distinct from the angle defined by the base surface of the second prism and the first lateral surface of the second prism and the angle defined by the base surface of the second prism and the second lateral surface of the second prism (e.g., in FIG. 5C, prism 526-1 and prism 526-2 are both isosceles triangles, and the angles defined by the lateral surfaces and the base of prism 526-1 are distinct from the angles defined by the lateral surfaces and the base of prism 526-2).

In some embodiments, each beam steerer of the array of beam steerers extends from a top portion of the electronic display to a bottom portion of the electronic display (e.g., beam steerers 406-1 and 406-2 of array 402 of beam steerers extend from a top portion of electronic display 405 to a bottom portion of electronic display 405 in FIG. 4A).

In some embodiments, the array of beam steerers includes a first beam steerer having a first length and a second beam steerer having a second length that is distinct from the first length. For example, array 422 of beam steerers includes prism 426-1 having a first length and prism 426-2 having a second length, which is shorter than the first length in FIG. 4B. In FIG. 4B, prism 426-1 located toward a center of the electronic display is longer than prism 426-2 located toward an edge of array 422 of beam steerers.

In some embodiments, the array of beam steerers includes a first beam steerer and a second beam steerer that is parallel to the first beam steerer. For example, prism 406-1 is parallel to prism 406-2 in FIG. 4A.

In some embodiments, the array of beam steerers is arranged in a barrel shape (e.g., array 422 of beam steerers is arranged in a barrel shape in FIG. 4B).

In some embodiments, two or more beam steerers of the array of beam steerers have at least 10 µm pitch (e.g., pitch 407 in FIG. 4A is at least 10 µm, e.g., 10, 15, 20, 25, 30, etc.).

In some embodiments, the array of display elements extending in a fifth direction and a sixth direction that is not parallel to the third direction. The inner left portion extends from the outer left portion in the fifth direction, the inner right portion extends from the inner left portion in the fifth direction, and the outer right portion extends from the inner right portion in the fifth direction. For example, electronic display 405 included in display device 400 has a rectangular shape extending in horizontal and vertical directions. Inner left portion 410 extends from outer left portion 408 horizontally toward right. Inner right portion 412 extends from inner left portion 410 horizontally toward right. Outer right portion 414 extends from inner right portion 412 horizontally toward right.

In some embodiments, the electronic display has a two-dimensional array of display elements, the fifth direction is a horizontal direction, and the sixth direction is a vertical direction (e.g., FIG. 4A).

In some embodiments, the array of beam steerers is mechanically coupled with the electronic display (e.g., array 402 of beam steerers is mechanically coupled with electronic display 405 in FIG. 5A). In some embodiments, the coupling is by an adhesive or by one or more couplers (e.g., one or more screws or one or more clamps).

In some embodiments, the electronic display is a single contiguous display that includes the array of display elements (e.g., electronic display 405 is contiguous and includes arrays of pixels 506 in FIG. 5A).

In some embodiments, the left region is not contiguous with the right region. For example, in some cases, left region 416 is separate from right region 418 in FIG. 4A.

In some embodiments, each of the inner left portion and the inner right portion has a width of not more than 40 mm (e.g., inner left portion 410 and inner right portion 412 have widths of not more than 40 mm in FIG. 4A).

In accordance with some embodiments, a method includes emitting light from an electronic display having a left portion and a right portion that does not overlap with the left region (e.g., FIG. 4A). The left region includes an outer left portion and an inner left portion that does not overlap with the outer left portion (e.g., FIG. 4A). The right region includes an outer right portion and an inner right portion that does not overlap with the outer right portion (e.g., FIG. 4A). The emitting includes emitting a first portion and a second portion of light from the inner left portion, and emitting a third portion and a fourth portion of light from the inner right portion. The method also includes steering, with an array of beam steerers located over at least the inner left portion and the inner right portion of the electronic display (e.g., FIG. 4A), at least the first portion of light emitted from the inner left portion of the electronic display in a first direction and steer at least the second portion of light emitted from the inner left portion of the electronic display in a second direction that is distinct from the first direction (e.g., FIG. 6C) and steer at least the third portion of light emitted from the inner right portion of the electronic display in a third direction and steer at least the fourth portion of light emitted from the inner right portion of the electronic display in a fourth direction that is distinct from the third direction (e.g., FIG. 6C).

In typical configurations, pixels (e.g., pixels 506-1, 506-2, 506-3 and 506-4 in FIG. 6C) are configured to display image information. As used herein, the term "image information" refers to information used for displaying an image. Typically, the image information includes color and intensity information for a plurality of pixels.

As discussed with respect to FIG. 6C, in some embodiments, array 402 of beam steerers is aligned with electronic display 405 so that valleys 622-1 and 622-2 of array 402 are aligned with edges of pixels 506-1 and 506-3, respectively. However, aligning array 402 of beam steerers with pixels of electronic display 405 can be challenging as the size of the pixels is fairly small. In some embodiments, the pitch of the prisms of the array of beam steerer varies. For example, in FIG. 5C, the pitch of prisms 526-1, and 526-2 is based on the distance between a respective prism from reference axis 404 of electronic display 514. In such cases, the valleys of array 540 are not necessarily aligned with pixels of electronic display 514 because the pitch of prisms 526-1 and 526-2 is variable, whereas the width of the pixels 516 remains constant throughout electronic display 516. Furthermore, the alignment can be especially challenging in embodiments, where the shape of the pixels is not a square or a rectangle, but instead a polygon, e.g., a pentile or a chevron.

Figure 6D:
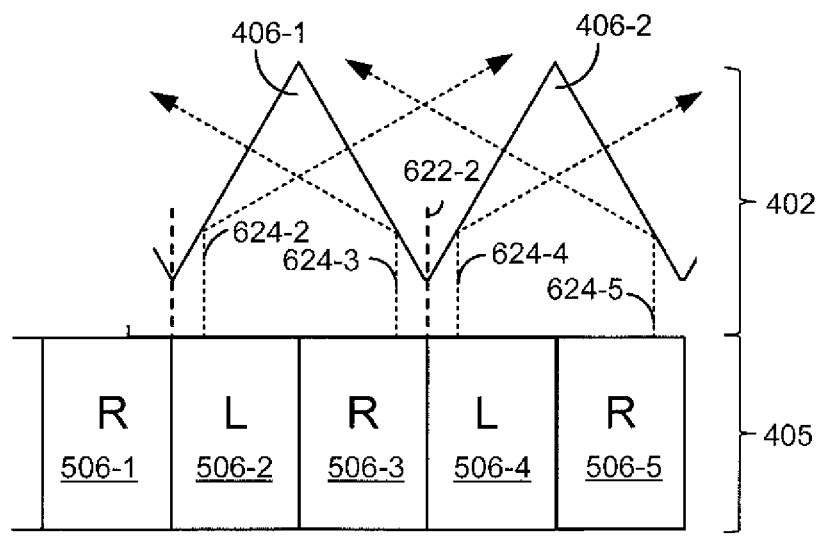
FIG. 6D is a schematic diagram illustrating transmission of light by a display device in accordance with some embodiments.

When array 402 of beam steerers is misaligned by one pixel, as shown in FIG. 6D, ray 624-2 from pixel 506-2, which is intended for the left eye, is directed to the right eye; ray 624-3 from pixel 506-3, which is intended for the right eye, is directed to the left eye; ray 624-4 from pixel 506-4, which is intended for the left eye, is directed to the right eye; ray 624-5 from pixel 506-5, which is intended for the right eye, is directed to the left eye.

Misalignment of electronic display 405 and array 402 of beam steerers leads to a situation where the left eye of the user sees one or more parts of an image intended for the right eye of the user and the right eye of the user sees one or more parts of an image intended for the left eye of the user. In contrast, if electronic display 405 is aligned with array 402 of beam steerers, the left eye of the user does not see the one or more parts of the image intended for the right eye of the user (the right eye of the user sees the one or more parts of the image intended for the right eye of the user), and the right eye of the user does not see the one or more parts of the image intended for the left eye of the user (the left eye of the user sees the one or more parts of the image intended for the left eye of the user). Therefore, the misalignment generates optical artifacts, which reduces the quality of user experience with the display device. For example, pixels 506-2 and 506-4 are configured to display image information for the left eye, and pixel 506-3 is configured to display image information for the right eye. However, the misalignment shown in FIG. 6D causes light emitted by pixels 506-2 and 506-4 to be directed toward the right eye and light emitted by pixel 506-3 to be directed toward the left eye.

In some cases, the display device and the array of beam steerers are misaligned by one or more sub-pixels, but less than one whole pixel.

Figure 7:
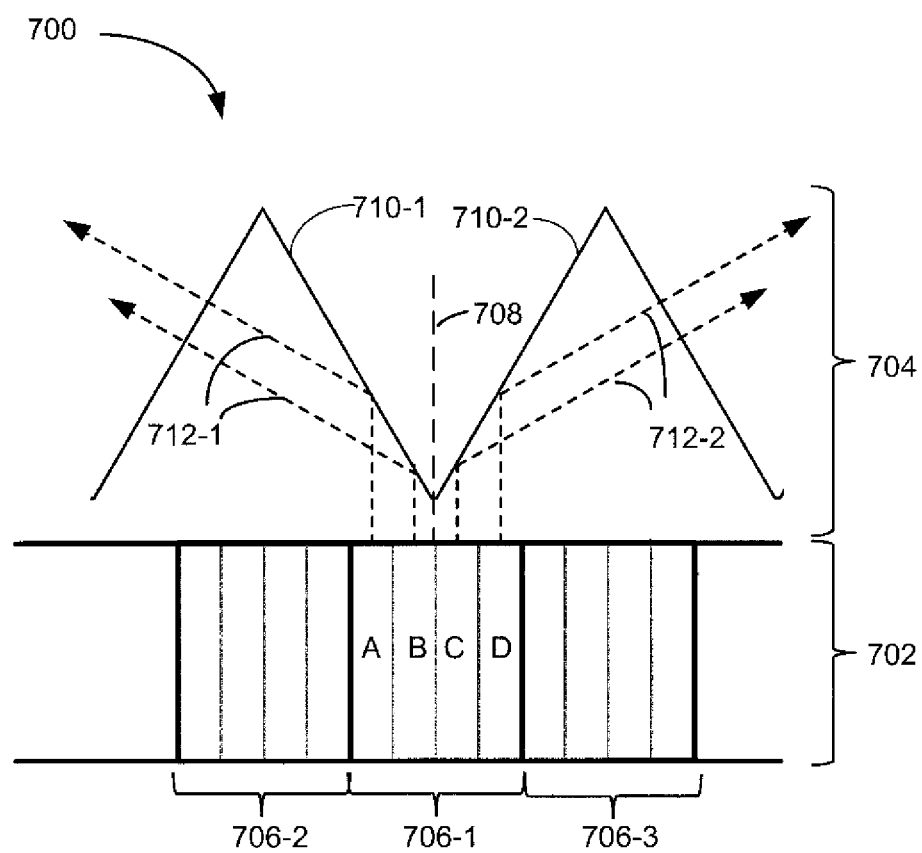
FIG. 7 is a schematic diagram illustrating transmission of light by a display device in accordance with some embodiments.

FIG. 7 is a schematic diagram illustrating transmission of light by display device 700 in accordance with some embodiments. Display device 700 corresponds to display device 400 described above with respect to FIG. 4A, except that, in display device 700, array 704 of beam steerers and electronic display 702 are misaligned by one or more sub-pixels. A portion of electronic display 702, shown in FIG. 7, includes three pixels 706-1, 706-2, and 706-3. Each of pixels 706-1, 706-2, and 706-3 includes four sub-pixels (e.g., sub-pixels A, B, C, and D of pixel 706-1). In some embodiments, each of pixels 706-1, 706-2, and 706-3 includes two or more subpixels. In some embodiments, each of pixels 706-1, 706-2, and 706-3 includes three or more subpixels. In some embodiments, each of sub-pixels A, B, C and D emits light of a respective color, such as green, red, blue, or any combination thereof. In FIG. 7, array 704 of beam steerers is coupled with electronic display 702 in such a manner that valley 708 between prism 710-1 and 710-2 is positioned at the intersection of sub-pixels B and C. When light emitted by pixel 706-1 is transmitted through array 704, rays 712-1 emitted by sub-pixels A and B are transmitted through prism 710-1 and reflected toward left, whereas rays 712-2 emitted by sub-pixels C and D are transmitted through prism 710-2 and reflected toward right. As a result, a portion of light from pixel 706-1 is directed to the left eye and another portion of light from pixel 706-1 is directed to the right eye.

To compensate for the misalignment, display device 400 is calibrated with a method described herein, and the image information displayed by the pixels of electronic display 405 is modified based on calibration information.

For calibration, alignment information is obtained based on determination of whether the light emitted by pixels or sub-pixel are transmitted toward the left eye or the right eye. Based on the alignment information, the image information for a respective pixel or a subpixel is modified so that the left eye receives images configured for the left eye and the right eye receives images configured for the right eye.

Figure 8A:
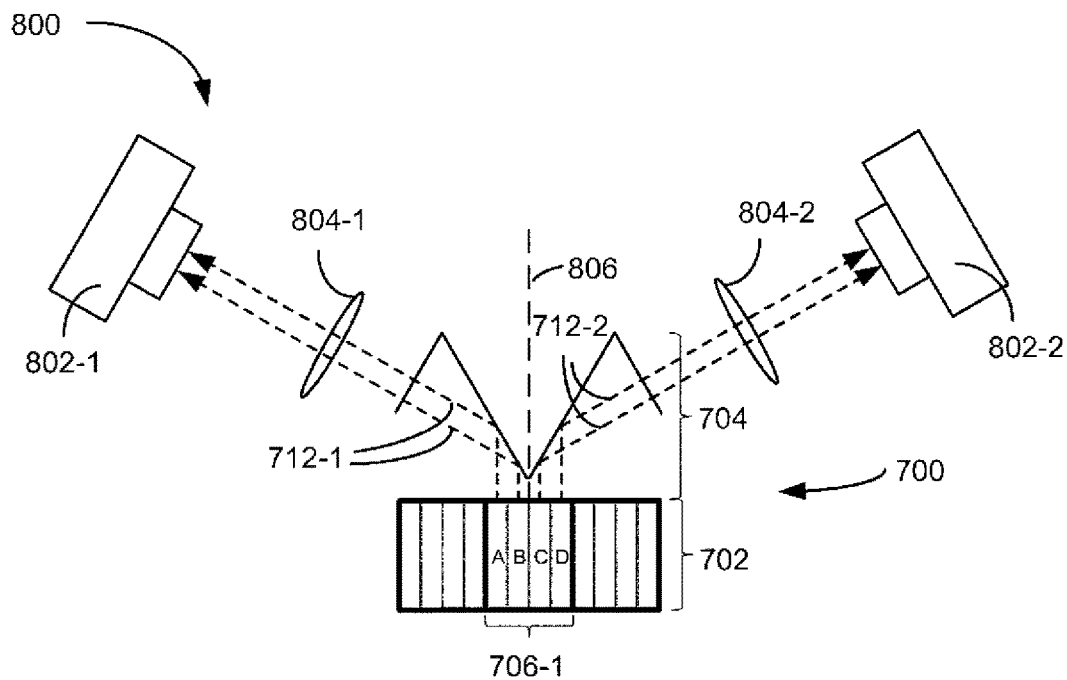
FIG. 8A is a schematic diagram illustrating a calibration system in accordance with some embodiments.

FIG. 8A is a schematic diagram illustrating calibration system 800 in accordance with some embodiments. Calibration system 800 includes display device 700 and optical sensors 802-1 and 802-2. Each of optical sensors 802-1 and 802-2 includes one or more cameras, one or more photodiodes, or some combination thereof. In some embodiments, optical sensors 802-1 and 802-2 are positioned opposite to each other with respect to reference axis 806, which passes through the middle of display device 700. In some embodiments, reference axis 806 corresponds to reference axis 404, as described above with respect to FIG. 4A. In some embodiments, a position of optical sensor 802-1 corresponds to a location of a left eye of a user and a position of optical sensor 802-2 corresponds to a location of a right eye of the user when display device 700 is worn by the user. Optical sensors 802-1 and 802-2 receive light emitted by electronic display 702 and steered by array 704 of beam steerers. The calibration system optionally includes optical components (e.g., lenses 804-1 and 804-2) for focusing and/or directing light.

Figure 8B:
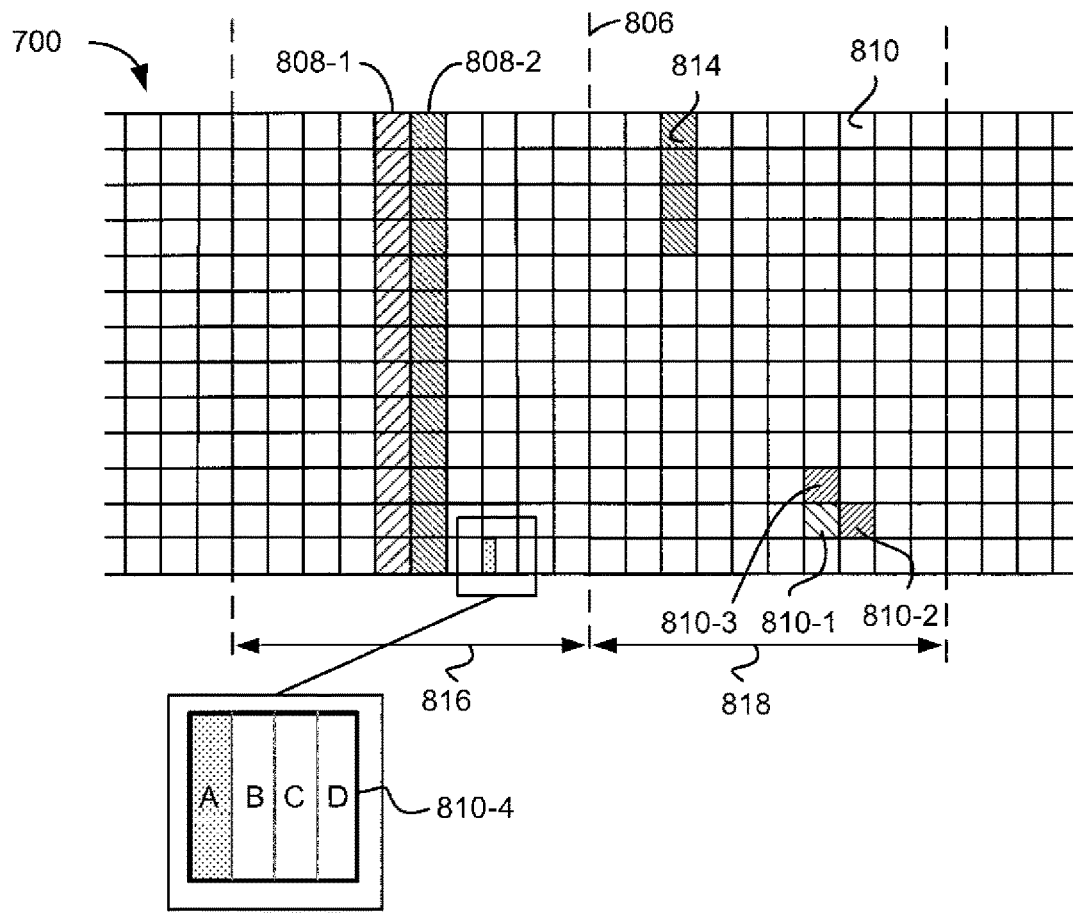
FIG. 8B is a schematic diagram illustrating an electronic display with subsets used for calibration in accordance with some embodiments.

FIG. 8B is a schematic diagram illustrating subsets of pixels in electronic display 700 used for calibration in accordance with some embodiments A front elevational view of a portion of electronic display 700 is shown in FIG. 8B, including inner left portion 816 and inner right portion 818 intersecting at reference axis 806. A portion of electronic display 700 includes pixels 810, that correspond to pixels 506 of electronic display 405 described above with respect to FIG. 5A. The collection of alignment information by calibration system 800 is started by selecting a subset of pixels 810 and causing the selected subset of pixels 810 to emit light. The subset includes one or more pixels (e.g., one, two, three, four, or five pixels, etc.). In some embodiments, the subset of pixels 810 is a vertical column of pixels (e.g., subset 808-1 or 808-2), a single pixel (e.g., pixel 810-1, 810-2, or 810-3), or a portion of a column including two or more adjacent pixels (e.g., subset 814 includes four adjacent pixels).

For obtaining the alignment information, subset 808-1 of pixels is selected to emit light. In some cases, light emitted by subset 808-1 of pixels is received by optical sensor 802-1 and no light is received by optical sensor 802-2. In some cases, light emitted by subset 808-1 of pixels is received by optical sensor 802-2 and no light is received by optical sensor 802-1. Based on this information, a determination is made as to whether subset 808-1 of pixels is aligned for optical sensor 802-1 or for optical sensor 802-2 (or both, or neither). Next, subset 808-2 of pixels is selected to emit light. In some cases, light emitted by subset 808-2 of pixels is received by optical sensor 802-1 and no light is received by optical sensor 802-2. In some cases, light emitted by subset 808-2 of pixels is received by optical sensor 802-2 and no light is received by optical sensor 802-1. Based on this information, a determination is made as to whether subset 808-2 of pixels is aligned for optical sensor 802-1 or for optical sensor 802-2 (or both, or neither). In some embodiments, subset 808-1 of pixels and subset 808-2 of pixels emit light sequentially so that only a single respective subset emits light at a particular time. For example, subset 808-1 of pixels emits light for certain duration of time, after which subset 808-2 of pixels emits light for certain duration of time. In some embodiments, this operation is repeated, subset by subset, for all subsets of inner left portion 816 and inner right portion 818.

In some other embodiments, the subset selected to emit light is a single pixel (e.g., pixel 810-1). Similar to the way described above, a determination is made as to whether pixel 810-1 is aligned for optical sensor 802-1 or for optical sensor 802-2 (or both, or neither). Next, pixel 810-2, which is on right side of pixel 810-1 or pixel 810-3, which is above pixel 810-1, is selected to emit light. Similarly to the steps described above with respect to pixel 810-1, in some embodiments, this operation is, pixel by pixel, for all of the pixels of inner left portion 816 and inner right portion 818. In some embodiments, pixel 810-1 and pixel 808-2 emit light sequentially so that only a single respective pixel emits light at a particular time. In yet other embodiments, the subset includes two or more pixels (e.g., subset 814). Similarly to the steps described above with respect to pixel 808-1, in some embodiments, this operation is repeated, subset by subset, for all other subsets (e.g., four-pixel subsets) of inner left portion 816 and inner right portion 818.

In some cases, the subsets (e.g., subset 808-1 or pixel 810-1) are not aligned for just one optical sensor. For example, a first portion of light emitted by pixel 810-1 is received by optical sensor 802-1 and a second portion of light emitted by pixel 810-1 is received by optical sensor 802-2. This occurs when electrical display 702 and array 704 of beam steerers are misaligned, as described above with respect to FIG. 7. Therefore, in some embodiments, a pixel includes a plurality of subpixels, and a subset of the sub-pixels (e.g., one, two, or three sub-pixels) is selected to emit light. In FIG. 8B inset, pixel 810-4 includes sub-pixels A, B, C and D, out of which sub-pixel A is selected to emit light. Similarly to the operation described above, a determination is made as to whether sub-pixel A of pixel 810-4 is aligned for optical sensor 802-1 or for optical sensor 802-2. In some embodiments, this operation is repeated, sub-pixel by sub-pixel, for all sub-pixels of inner left portion 816 and inner right portion 818. In some embodiments, each of sub-pixels A, B, C and D corresponds to a respective color, such as green, red, blue, or any combination thereof (e.g., sub-pixel A corresponds to red, sub-pixel B corresponds to green, sub-pixel C corresponds to blue, and sub-pixel D corresponds to red). In some embodiments, the determination operation is repeated for each pixel color-by-color.

In some embodiments, all sub-pixels A, corresponding to sub-pixels emitting red light, of pixels of subset 808-1 are selected to emit light, and a determination is made as to whether each of the sub-pixels is aligned for optical sensor 802-1 or optical sensor 802-2. In some embodiments, this operation is repeated, color by color, for all sub-pixels of all subsets of inner left portion 816 and inner right portion 818.

In some embodiments, electrical display 702 and array 704 of beam steerers are misaligned so that light emitted by a sub-pixel, such as subpixel A of pixel 810-4, is received by both optical sensor 802-1 and optical sensor 802-2. In such cases, a comparison between the intensity of light received by each optical sensor is made to determine whether sub-pixel A of pixel 810-4 is aligned for optical sensor 802-1 or for optical sensor 802-2

The alignment information obtained as described above is stored and used for calibration of image information for presentation by electronic display 700. In some embodiments, the alignment information is processed and stored by one or more processors 216 and memory 228 of display device 205 as described above with respect to FIG. 2. Based on the alignment information obtained, a determination whether the image information of a pixel or a sub-pixel is configured for display to the left eye or the right eye is made. In accordance with determination that the image information corresponding to the respective pixel or the respective sub-pixel is configured for display to the left eye, the image information corresponding to the respective pixel or the respective sub-pixel is modified. In accordance with determination that the image information corresponding to the respective pixel or the respective sub-pixel is configured for display to the right eye, the image information corresponding to the respective pixel or the respective sub-pixel is modified. Methods of modifying image information are described below with respect to FIGS. 9A-9C.

Figure 9A:
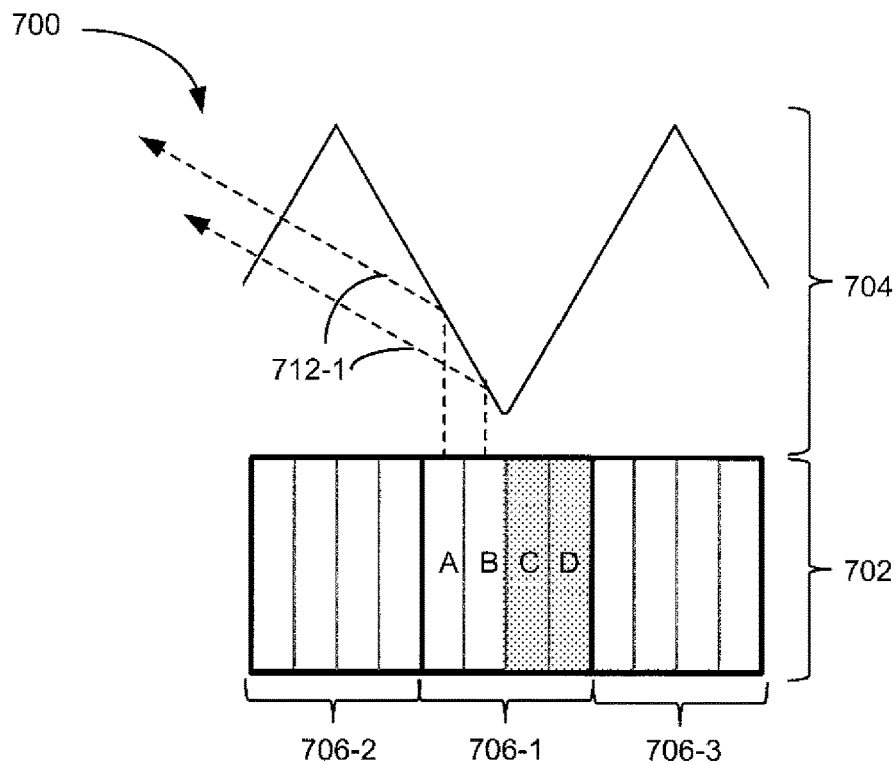
FIG. 9A is a schematic diagram illustrating transmission of light by a display device with modified image information in accordance with some embodiments.

FIG. 9A is a schematic diagram illustrating transmission of light by display device 700 with modified image information in accordance with some embodiments. In FIG. 9A, pixel 706-1 is selected to display image information for a left eye and pixel 706-3 is configured to display image information for a right eye. Based on alignment information, it is determined that light emitted by sub-pixels A and B of pixel 706-1 is directed toward the left eye (e.g., sub-pixels A and B are aligned for the left eye) and light emitted by sub-pixels C and D of pixel 706-1 is directed toward the right eye (e.g., sub-pixels C and D are aligned for the right eye). Therefore, the image information displayed by sub-pixels C and D requires a modification. The image information for sub-pixels C and D of pixel 706-1 in FIG. 9A is modified so that the image information is replaced with information representing a dark region. Therefore, sub-pixels C and D of pixel 706-1 do not emit light toward right eye and, therefore, the user only sees, with the left eye, a portion of an image intended for the left eye. For example, in a situation where a determination is made that a sub-pixel is aligned for both optical sensor 802-1 and optical sensor 802-2, image information provided the sub-pixel is modified so that the sub-pixel is turned off or an intensity of light emitted by the sub-pixel is reduced.

Figure 9B:
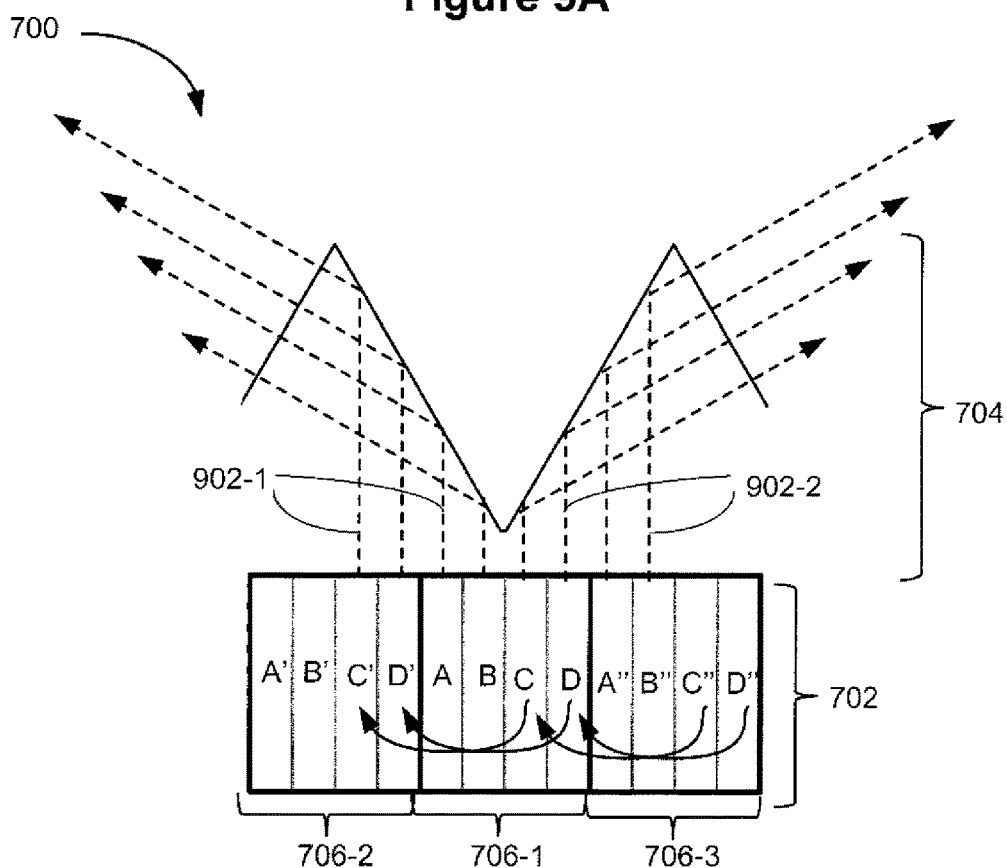
FIG. 9B is a schematic diagram illustrating transmission of light by a display device with modified image information in accordance with some embodiments.

In some embodiments, the modification includes re-directing image information. FIG. 9B is a schematic diagram illustrating transmission of light by display device 700 based on modified image information in accordance with some embodiments. As described with respect to FIG. 9A, pixel 706-1 is configured to display image information for a left eye and pixel 706-3 is configured to display image information for a right eye. Pixel 706-1 includes sub-pixels A, B, C and D, pixel 706-2 includes sub-pixels A', B' C' and D' and pixel 706-3 includes sub-pixels A", B", C" and D". Based on alignment information obtained, it is determined that light emitted by sub-pixels A and B of pixel 706-1 is directed towards the left eye (e.g., sub-pixels A and B are aligned for the left eye) and light emitted by sub-pixels C and D of pixel 706-1 is directed toward the right eye (e.g., sub-pixels C and D are aligned for the right eye). In FIG. 9B, the image information corresponding to sub-pixels C and D is modified so that the image information of sub-pixels C and D is shifted for display by sub-pixels C' and D'. Simultaneously, the image information of sub-pixels C and D is replaced by image information of sub-pixels C" and D". After this modification, rays 902-1 emitted by sub-pixels C' and D' and sub-pixels A and B are directed toward the left eye. Rays 902-2 emitted by sub-pixels C. D. A" and B" are directed toward the right eye. In this way, image information is modified so that images for the left eye are displayed by sub-pixels aligned for the left eye, and images for the right eye are displayed by sub-pixels aligned for the right eye.

Figure 9C:
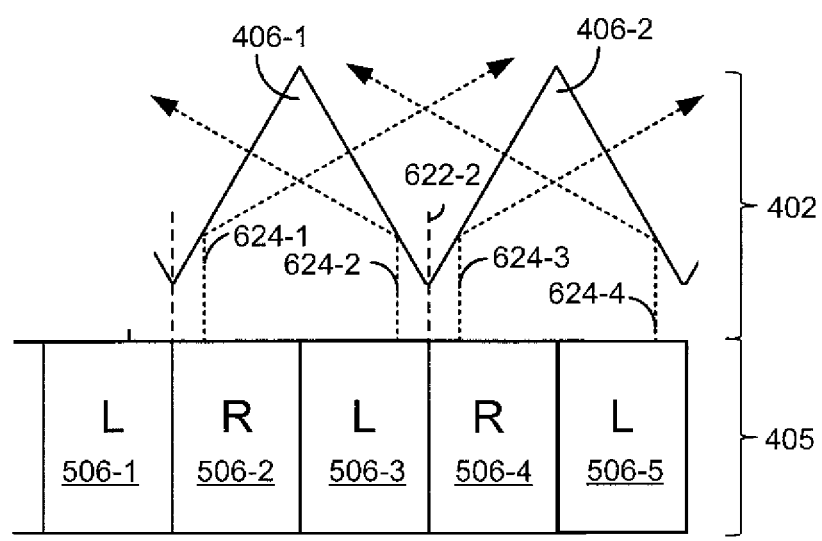
FIG. 9C is a schematic diagram illustrating transmission of light by a display device with modified image information in accordance with some embodiments.

In some embodiments, the image information is shifted by one or more pixels. For example, when electronic device 405 and array 402 of beam steerers are misaligned by one or more pixels as shown in FIG. 6D, the image information is shifted by one or more pixels to compensate for the misalignment as shown in FIG. 9C. In some embodiments, the image information is shifted toward right. In some embodiments, the image information is shifted toward left.

In light of these principles, we now turn to certain embodiments of a calibration of a head-mounted display device.

A method for calibrating a head-mounted display device includes obtaining a head-mounted display device that includes an electronic display (e.g., display device 700 includes electronic display 702 that has an array of pixels, such as pixels 706-1, 706-2 and 706-3 in FIG. 7). The electronic display has a left portion and a right portion that does not overlap with the left portion (e.g., FIG. 4A). The left portion includes an outer left portion and an inner left portion that does not overlap with the outer left portion (e.g., FIG. 4A). The right portion includes an outer right portion and an inner right portion that does not overlap with the outer right portion (e.g., FIG. 4A). The inner left portion and the inner right portion are located between the outer left portion and the outer right portion (e.g., FIG. 4A). The head-mounted display device also includes an array of beam steerers located over at least the inner left portion and the inner right portion of the electronic display (e.g., display device 700 includes array 704 of beam steerers).

The method also includes obtaining alignment information by selecting a first respective subset of the array of display elements and causing the first respective subset of the array of display elements to emit light. The method further includes determining whether the light emitted by the first respective subset of the array of display elements is received by a first optical sensor in a first position or a second optical sensor in a second position that is distinct from the first position, thereby determining whether the first respective subset of the array of display elements is aligned for the first optical sensor or the second optical sensor. For example, calibration system 800 includes display device 700, optical sensor 802-1 and optical sensor 802-2 in FIG. 8A. Optical sensor 802-1 is positioned on the left side of display device 700 and optical sensor 802-2 is positioned on the right side of display device 700. Rays 712-1 submitted by electronic display 700 are received by optical sensor 802-1 and rays 712-2 submitted by electronic display 700 are received by optical sensor 802-2. For obtaining alignment information, subset 808-1 of electronic display 700 is selected to emit light as shown in FIG. 8B. If the light emitted by subset 808-1 is received by optical sensor 802-1, a determination is made that subset 808-1 is aligned for optical sensor 802-1. If the light emitted by subset 808-2 is received by optical sensor 802-2, a determination is made that subset 808-1 is aligned for optical sensor 802-2.

The method also includes repeating the selecting, causing, and determining operations for a second subset of the array of display elements that is distinct from the first subset of the array of display elements (e.g., subset 808-2 in FIG. 8B). The method also includes storing the alignment information for calibrating images for presentation by the electronic display.

In some embodiments, the method also includes causing a plurality of distinct subsets of the array of display elements to sequentially emit light so that only a single respective subset of the array of display elements emits light at a particular time, and determining whether the light emitted by the single respective subset of the array of display elements is received by the first optical sensor or the second optical sensor, thereby determining whether the single respective subset of the array of display elements is aligned for the first optical sensor or the second optical sensor. For example, subsets 808-1 and 808-2 sequentially emit light so that each subset 808-1 and 808-2 emits light at a particular time in FIG. 8B. A determination is made as to whether each subset 808-1 and 808-2 is aligned for optical sensor 802-1 or for optical sensor 808-2.

In some embodiments, the single respective subset of the array of display elements includes two or more display elements of the array of display elements (e.g., subsets 808-1, 808-2, and 814 of electronic display 700 include two or more pixels 810 in FIG. 8B).

In some embodiments, the single respective subset or the array of display elements includes at least a single column of display elements of the array of display elements (e.g., subset 808-1 in FIG. 8B).

In some embodiments, the method includes causing respective display elements of the array of display elements to sequentially emit light so that only a single respective display element of the array of display elements emits light at a particular time, and determining whether the light emitted by the single respective display element of the array of display elements is received by the first optical sensor or the second optical sensor, thereby determining whether the single respective display element of the array of display elements is aligned for the first optical sensor or the second optical sensor. For example, pixels 810-1, 810-2, and 810-3 are caused to sequentially emit light so that each pixel 810-1, 810-2, and 810-3 emits light at a particular time in FIG. 8B. A determination is made as to whether each pixel 810-1, 810-2, and 810-3 is aligned for optical sensor 802-1 or for optical sensor 808-2.

In some embodiments, respective display elements of the array of display elements each include a plurality of sub-pixels (e.g., sub-pixels A, B, C and D of pixel 810-4 in the inset of FIG. 8B), and the method further includes causing a plurality of distinct subsets of the plurality of sub-pixels to sequentially emit light so that only a single respective subset of the plurality of distinct subsets of the plurality of sub-pixels emits light at a particular time. The method also includes determining whether the light emitted by the single respective subset of the plurality of distinct subsets of the plurality of sub-pixels is received by the first optical sensor or the second optical sensor, thereby determining the single respective subset of the plurality of distinct subsets of the plurality of sub-pixels is aligned for the first optical sensor or the second optical sensor. For example, a subset of sub-pixels A, B, C, and D of pixel 810-4 are caused to sequentially emit light so that each subset of sub-pixels A, B, C and D emits light at a particular time in the inset of FIG. 8B. A determination is made as to whether each subset of sub-pixels A, B. C and D is aligned for optical sensor 802-1 or for optical sensor 808-2.

In some embodiments, the single respective subset of the plurality of sub-pixels includes only a single sub-pixel of the plurality of sub-pixels (e.g., sub-pixel A in FIG. 8B inset).

In some embodiments, the alignment information indicates whether respective sub-pixels of the plurality of sub-pixels are aligned for the first optical sensor or the second optical sensor (e.g., sub-pixels A and B are aligned for optical sensor 802-1 and sub-pixels 802-2 are aligned for optical sensor 802-2 in FIG. 8A).

In some embodiments, the first position corresponds to a location of a left eye of a user when the device is worn by the user and the second position corresponds to a location of a right eye of the user when the device is worn by the user. For example, position of optical sensor 802-1 corresponds to a location of a left eye of the user and position of optical sensor 802-2 corresponds to a location of a right eye of the user when display device 700 is worn by the user.

In some embodiments, the alignment information indicates whether respective subsets of the array of display elements are aligned for the first optical sensor or the second optical sensor (e.g., subset 808-1 is aligned for optical sensor 802-1 or optical sensor 802-2).

A method includes receiving image information for display (e.g., electronic display device 702 receives image information) and modifying the image information based on alignment information that indicates whether respective subsets of the array of display elements are aligned for a first eye of a user or a second eye of the user, thereby obtaining modified image information (e.g., the image information received by pixel 506-2 is modified based on alignment information as shown in FIG. 9C. The method also includes displaying the modified image information on an electronic display of a head-mounted display device. The electronic display has an array of display elements (e.g., FIG. 7). The electronic display has a left portion and a right portion that does not overlap with the left portion (e.g., FIG. 4A). The left portion includes an outer left portion and an inner left portion that does not overlap with the outer left portion (e.g., FIG. 4A). The right portion includes an outer right portion and an inner right portion that does not overlap with the outer right portion and the inner left portion and the inner right portion are located between the outer left portion and the outer right portion (e.g., FIG. 4A). The head-mounted display device also includes an array of beam steerers located over at least the inner left portion and the inner right portion of the electronic display (e.g., FIG. 4A).

In some embodiments, modifying the image information based on the alignment information includes replacing a plurality of subsets of the image information with replacement information (e.g., the image information received by pixel 506-2 is replaced with the image information for pixel 506-1 as shown in FIG. 9C).

In some embodiments, the image information represents an image to be displayed to a user, and the image includes a left portion and a right portion that does not overlap with the left portion. Modifying the image information includes modifying subsets of the left portion of the image that are aligned for the right eye, and modifying subsets of the right portion of the image that are aligned for the left eye. For example, in FIG. 9C, image information for pixel 506-3, which was intended for the right eye, is replaced with image information for pixel 506-2 so that the light from pixel 506-3 is aligned for the right eye, and image information for pixel 506-4, which was intended for the left eye, is replaced with image information for pixel 506-3, which is intended for the left eye.

In some embodiments, the replacement information is determined based on the image information. For example, the replacement information for subsets of the left portion of the image that are aligned for the right eye are based from subsets of the left portion of the image, shifted by a predefined number of pixels (e.g., as shown in FIG. 9C, the replacement information for pixel 506-2 corresponds to the image information for pixel 506-1).

In some embodiments, the replacement information is determined based on nasal image information that is distinct from the image information (e.g., nasal image information is received by pixels in inner left region 410 and inner right region 412 and image information is received by outer left region 408 and outer right region 414 in FIG. 4A). In some embodiments, the nasal image information includes a low-resolution (or a monochrome) ambient image. Because the peripheral vision of a human eye has a low spatial resolution, the nasal image information does not need high-resolution information. In some embodiments, a color of the ambient image is selected based on the image information. In some embodiments, the replacement information is independent of the image information.

In some embodiments, respective display elements of the array of display elements each include a plurality of sub-pixels, and the method includes identifying one or more display elements, a respective display element of the one or more display elements including one or more sub-pixels aligned for the first eye and one or more sub-pixels aligned for the second eye (e.g., sub-pixels A and B of pixel 706-1 are aligned for left eye and sub-pixels C and D are aligned for the left eye in FIG. 7). The method also includes modifying the image information that corresponds to the one or more display elements (e.g., image information corresponding to pixel 706-1 is modified as shown in FIGS. 9A and 9B).

In some embodiments, the method includes determining whether the image information corresponding to the respective display element is configured for display to the first eye or the second eye. The method also includes, in accordance with a determination that the image information corresponding to the respective display element is configured for display to the first eye, modifying the image information corresponding to the one or more sub-pixels aligned for the second eye. The method further includes, in accordance with a determination that the image information corresponding to the respective display element is configured for display to the second eye, modifying the image information corresponding to the one or more sub-pixels aligned for the first eye. For example, as shown in FIG. 9A, when the pixel is configured for display to the left eye, the image information for sub-pixels C and D are modified (e.g., the image information for sub-pixels C and D are modified to turn off sub-pixels C and D).

In some embodiments, modifying the image information corresponding to the one or more sub-pixels aligned for the second eye includes replacing the image information corresponding to the one or more sub-pixels aligned for the second eye with information that represents a dark region (e.g., FIG. 9A) and/or modifying the image information corresponding to the one or more sub-pixels aligned for the first eye includes replacing the image information corresponding to the one or more sub-pixels aligned for the first eye with information that represents a dark region. For example, in FIG. 9A, the image information corresponding to sub-pixels C and D of pixel 706-1 is modified by replacing the image information with information that represents a dark region (e.g., sub-pixels C and D are turned off or the intensity of light emitted by sub-pixels C and D is reduced).

In some embodiments, modifying the image information corresponding to the one or more sub-pixels aligned for the second eye includes shifting the image information corresponding to the one or more sub-pixels aligned for the second eye so that the image information corresponding to the one or more sub-pixels aligned for the second eye is displayed toward the second eye and/or modifying the image information corresponding to the one or more sub-pixels aligned for the first eye includes shifting the image information corresponding to the one or more sub-pixels aligned for the first eye so that the image information corresponding to the one or more sub-pixels aligned for the first eye is displayed toward the first eye. For example, in FIG. 9B, the image information of pixel 706-1 is configured to display a left portion of an image and pixels 706-2 and 706-3 are configured to display a right portion of the image. Sub-pixels C and D of pixel 706-1 are aligned for the right eye. Therefore, the image information corresponding to sub-pixels C and D is modified by shifting the image information corresponding to sub-pixels C" and D" to sub-pixels C and D. Simultaneously, the image information corresponding to sub-pixels C and D are shifted to sub-pixels C' and D'. After the modification, rays 902-1 directed toward the left eye correspond to image information for the left eye and rays 902-2 directed toward the right eye correspond to image information for the right eye.

A display system includes a head-mounted display device that includes an electronic display having an array of display elements (e.g., display device 400 in FIG. 4A). The electronic display has a left portion and a right portion that does not overlap with the left portion (e.g., FIG. 4A). The left portion includes an outer left portion and an inner left portion that does not overlap with the outer left portion (e.g., FIG. 4A). The right portion includes an outer right portion and an inner right portion that does not overlap with the outer right portion (e.g., FIG. 4A). The inner left portion and the inner right portion are located between the outer left portion and the outer right portion (e.g., FIG. 4A). The head-mounted display device also includes an array of beam steerers located over at least the inner left portion and the inner right portion of the electronic display (e.g., FIG. 4A). The head-mounted display device also includes one or more processors and memory (e.g., one or more processors 216 and memory 226). The memory stores alignment information that indicates whether respective subsets of the array of display elements are aligned for the first optical sensor or the second optical sensor (e.g., alignment information obtained by calibration system 800 is stored in memory 226). The memory also stores instructions for: receiving image information, modifying the image information based on the alignment information, thereby obtaining modified alignment information, and displaying the modified image information on the electronic display.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for calibrating a head-mounted display device, comprising:
   obtaining a head-mounted display device that includes:
      an electronic display having an array of display elements, wherein:
         the electronic display has a left portion and a right portion that does not overlap with the left portion;
         the left portion includes an outer left portion and an inner left portion that does not overlap with the outer left portion;
         the right portion includes an outer right portion and an inner right portion that does not overlap with the outer right portion; and
         the inner left portion and the inner right portion are located between the outer left portion and the outer right portion; and
      an array of beam steerers located over at least the inner left portion and the inner right portion of the electronic display;
   obtaining alignment information by:
      selecting a first respective subset of the array of display elements;
      causing the first respective subset of the array of display elements to emit light;
      determining whether the light emitted by the first respective subset of the array of display elements is received by a first optical sensor in a first position or a second optical sensor in a second position that is distinct from the first position, thereby determining whether the first respective subset of the array of display elements is aligned for the first optical sensor or the second optical sensor; and
      repeating the selecting, causing, and determining operations for a second subset of the array of display elements that is distinct from the first subset of the array of display elements; and storing the alignment information for calibrating images for presentation by the electronic display.

2. The method of claim 1, including:
causing a plurality of distinct subsets of the array of display elements to sequentially emit light so that only a single respective subset of the array of display elements emits light at a particular time; and
determining whether the light emitted by the single respective subset of the array of display elements is received by the first optical sensor or the second optical sensor, thereby determining whether the single respective subset of the array of display elements is aligned for the first optical sensor or the second optical sensor.

3. The method of claim 2, wherein:
the single respective subset of the array of display elements includes two or more display elements of the array of display elements.

4. The method of claim 3, wherein:
the single respective subset of the array of display elements includes at least a single column of display elements of the array of display elements.

5. The method of claim 2, including:
causing respective display elements of the array of display elements to sequentially emit light so that only a single respective display element of the array of display elements emits light at a particular time; and
determining whether the light emitted by the single respective display element of the array of display elements is received by the first optical sensor or the second optical sensor, thereby determining whether the single respective display element of the array of display elements is aligned for the first optical sensor or the second optical sensor.

6. The method of claim 1, wherein:
respective display elements of the array of display elements each include a plurality of sub-pixels; and
the method includes:
causing a plurality of distinct subsets of the plurality of sub-pixels to sequentially emit light so that only a single respective subset of the plurality of distinct subsets of the plurality of sub-pixels emits light at a particular time; and
determining whether the light emitted by the single respective subset of the plurality of distinct subsets of the plurality of sub-pixels is received by the first optical sensor or the second optical sensor, thereby determining the single respective subset of the plurality of distinct subsets of the plurality of sub-pixels is aligned for the first optical sensor or the second optical sensor.

7. The method of claim 6, wherein:
the single respective subset of the plurality of sub-pixels includes only a single sub-pixel of the plurality of sub-pixels.

8. The method of claim 6, wherein:
the alignment information indicates whether respective sub-pixels of the plurality of sub-pixels are aligned for the first optical sensor or the second optical sensor.

9. The method of claim 1, wherein:
the first position corresponds to a location of a left eye of a user when the device is worn by the user and the second position corresponds to a location of a right eye of the user when the device is worn by the user.

10. The method of claim 1, wherein:
the alignment information indicates whether respective subsets of the array of display elements are aligned for the first optical sensor or the second optical sensor.

11. A method, comprising:
receiving image information for display;
modifying the image information based on alignment information that indicates whether respective subsets of an array of display elements are aligned for a first eye of a user or a second eye of the user, thereby obtaining modified image information; and
displaying the modified image information on an electronic display of a head-mounted display device, wherein:
the electronic display has an array of display elements, wherein:
the electronic display has a left portion and a right portion that does not overlap with the left portion;
the left portion includes an outer left portion and an inner left portion that does not overlap with the outer left portion;
the right portion includes an outer right portion and an inner right portion that does not overlap with the outer right portion; and
the inner left portion and the inner right portion are located between the outer left portion and the outer right portion; and
the head-mounted display device also includes an array of beam steerers located over at least the inner left portion and the inner right portion of the electronic display.

12. The method of claim 11, wherein:
modifying the image information based on the alignment information includes replacing a plurality of subsets of the image information with replacement information.

13. The method of claim 12, wherein:
the image information represents an image to be displayed to the user;
the image includes a left portion and a right portion that does not overlap with the left portion; and
modifying the image information includes:
modifying subsets of the left portion of the image that are aligned for a right eye of the user; and
modifying subsets of the right portion of the image that are aligned for a left eye of the user.

14. The method of claim 12, wherein:
the replacement information is determined based on the image information.

15. The method of claim 12, wherein:
the replacement information is determined based on nasal image information that is distinct from the image information.

16. The method of claim 11, wherein:
respective display elements of the array of display elements each include a plurality of sub-pixels; and
the method includes:
identifying one or more display elements, a respective display element of the one or more display elements including one or more sub-pixels aligned for the first eye and one or more sub-pixels aligned for the second eye; and
modifying the image information that corresponds to the one or more display elements.

17. The method of claim 16, including:
determining whether the image information corresponding to the respective display element is configured for display to the first eye or the second eye;
in accordance with a determination that the image information corresponding to the respective display element is configured for display to the first eye, modifying the image information corresponding to the one or more sub-pixels aligned for the second eye; and, in accordance with a determination that the image information corresponding to the respective display element is configured for display to the second eye, modifying the image information corresponding to the one or more sub-pixels aligned for the first eye.

18. The method of claim 17, wherein:

modifying the image information corresponding to the one or more sub-pixels aligned for the second eye includes replacing the image information corresponding to the one or more sub-pixels aligned for the second eye with information that represents a dark region; and/or modifying the image information corresponding to the one or more sub-pixels aligned for the first eye includes replacing the image information corresponding to the one or more sub-pixels aligned for the first eye with information that represents a dark region.

19. The method of claim 17, wherein:

modifying the image information corresponding to the one or more sub-pixels aligned for the second eye includes shifting the image information corresponding to the one or more sub-pixels aligned for the second eye so that the image information corresponding to the one or more sub-pixels aligned for the second eye is displayed toward the second eye; and/or modifying the image information corresponding to the one or more sub-pixels aligned for the first eye includes shifting the image information corresponding to the one or more sub-pixels aligned for the first eye so that the image information corresponding to the one or more sub-pixels aligned for the first eye is displayed toward the first eye.

20. A display system, comprising:

a head-mounted display device that includes:

an electronic display having an array of display elements, wherein:

the electronic display has a left portion and a right portion that does not overlap with the left portion;

the left portion includes an outer left portion and an inner left portion that does not overlap with the outer left portion;

the right portion includes an outer right portion and an inner right portion that does not overlap with the outer right portion; and the inner left portion and the inner right portion are located between the outer left portion and the outer right portion; and an array of beam steerers located over at least the inner left portion and the inner right portion of the electronic display;

one or more processors; and memory storing:

alignment information that indicates whether respective subsets of the array of display elements are aligned for a first optical sensor or a second optical sensor; and instructions for:

receiving image information;

modifying the image information based on the alignment information, thereby obtaining modified alignment information; and displaying the modified image information on the electronic display.

\* \* \* \* \*